United States Patent
McAlister et al.

(10) Patent No.: US 9,122,741 B1
(45) Date of Patent: Sep. 1, 2015

(54) SYSTEMS AND METHODS FOR REDUCING DATABASE INDEX CONTENTION AND GENERATING UNIQUE DATABASE IDENTIFIERS

(71) Applicant: Amazon Technologies, Inc., Reno, NV (US)

(72) Inventors: Grant Alexander Macdonald McAlister, Seattle, WA (US); Chelsea C. Krueger, Seattle, WA (US); Dallas L. Willett, Seattle, WA (US); Michael J. Russo, Seattle, WA (US); Ramnath R. Iyer, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/626,663

(22) Filed: Sep. 25, 2012

Related U.S. Application Data

(63) Continuation-in-part of application No. 13/569,935, filed on Aug. 8, 2012.

(51) Int. Cl.
*G06F 17/30* (2006.01)
(52) U.S. Cl.
CPC .................. *G06F 17/30595* (2013.01)
(58) Field of Classification Search
CPC ................................................. G06F 17/30595
USPC .................. 707/640, 661, 674, 694, 802, 818
See application file for complete search history.

(56) References Cited

U.S. PATENT DOCUMENTS

| | | | |
|---|---|---|---|
| 6,026,398 A | 2/2000 | Brown et al. | |
| 6,363,389 B1 | 3/2002 | Lyle et al. | |
| 6,714,948 B1 | 3/2004 | Richards | |
| 6,859,808 B1 | 2/2005 | Chong et al. | |
| 7,685,185 B2 * | 3/2010 | Ramasubramanian et al. | 707/638 |
| 8,365,185 B2 * | 1/2013 | Bobak et al. | 718/106 |
| 8,429,162 B1 | 4/2013 | Wang et al. | |
| 8,700,674 B2 | 4/2014 | Bear et al. | |
| 2005/0119875 A1 | 6/2005 | Shaefer et al. | |
| 2008/0016085 A1 | 1/2008 | Goff | |
| 2008/0052322 A1 | 2/2008 | Gusciora | |
| 2009/0150973 A1 | 6/2009 | Kim et al. | |
| 2011/0320604 A1 | 12/2011 | Kulkarni et al. | |
| 2012/0259894 A1 | 10/2012 | Varley et al. | |
| 2013/0036149 A1 | 2/2013 | Kosuru et al. | |

* cited by examiner

*Primary Examiner* — Sana Al Hashemi
(74) *Attorney, Agent, or Firm* — Sutherland Asbill & Brennan LLP

(57) ABSTRACT

Described herein are system and methods for mitigating index contention issues in databases. The database server may generate additional storage locations to prevent overloading one or more current storage locations. A variety of database conditions may be used to trigger an increase or decrease in storage locations. In one embodiment, more storage locations may be generated when the amount of data records waiting to be written at a storage location exceeds or equals a threshold amount. Likewise, the database server may reduce the amount of current storage locations when the amount of data records is less than a threshold amount. The record identifiers may incorporate a location reference for their designated storage location. The reference may be a string that includes numbers, letters, or a combination thereof.

20 Claims, 14 Drawing Sheets

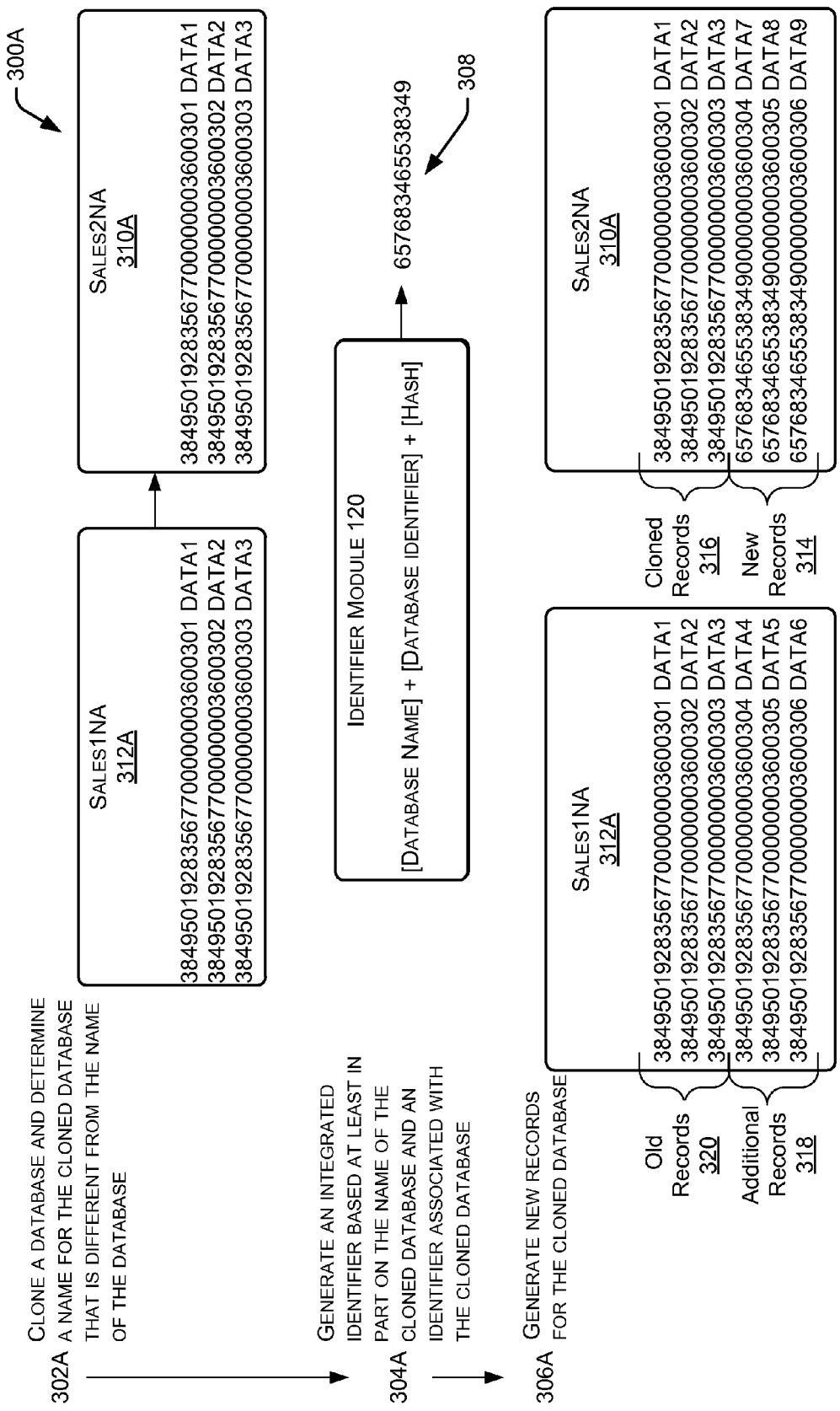

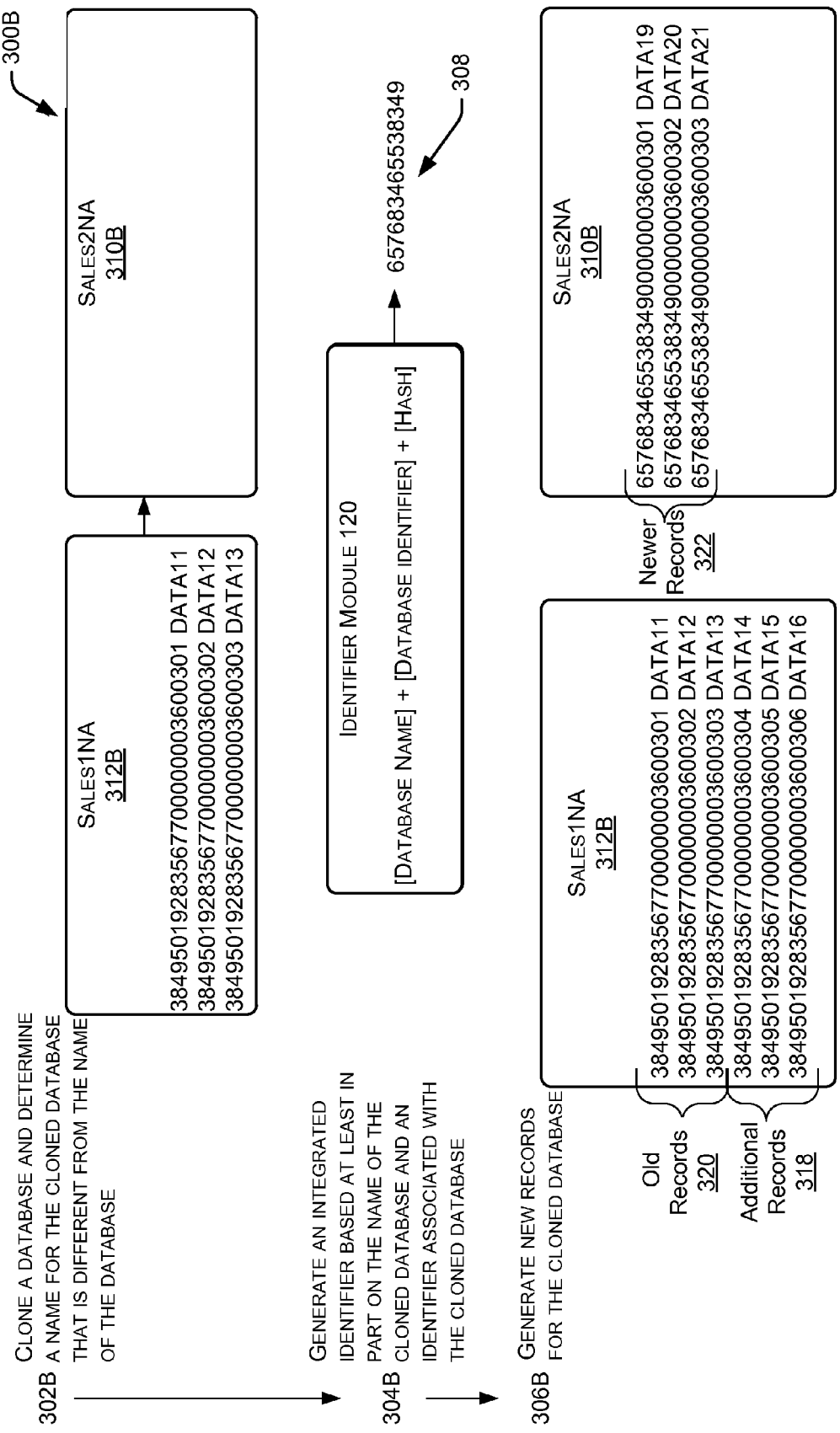

ns set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

SYSTEMS AND METHODS FOR REDUCING DATABASE INDEX CONTENTION AND GENERATING UNIQUE DATABASE IDENTIFIERS

PRIORITY CLAIM TO RELATED APPLICATIONS

This application is a continuation-in-part of application Ser. No. 13/569,935 filed Aug. 8, 2012, wherein the application Ser. No. 13/569,935 is herein incorporated by reference.

BACKGROUND

The online industry has increased at a rapid pace and may continue to expand into the future with new products, services, and/or capabilities. Databases that store information related to the products, services and/or capabilities are ever increasing to meet the increase in demand. As a database increases in size, the efficiency in storing and accessing data decreases. One way to improve efficiency is to increase the number of databases to distribute database queries amongst a group of databases. Accordingly, techniques or methods that increase the uniqueness of the sequence values and improve database efficiency may be desirable.

BRIEF DESCRIPTION OF THE DRAWINGS

FIG. 3A illustrates a flow diagram with accompanying illustration of a method for cloning a database and incorporating a new integrated identifier into the cloned database that includes cloned data in accordance with one or more embodiments of the disclosure.

FIG. 3B illustrates a flow diagram with accompanying illustration of a method for cloning a database and incorporating a new integrated identifier into the cloned database that may not include cloned data in accordance with one or more embodiments of the disclosure.

Figure 1:
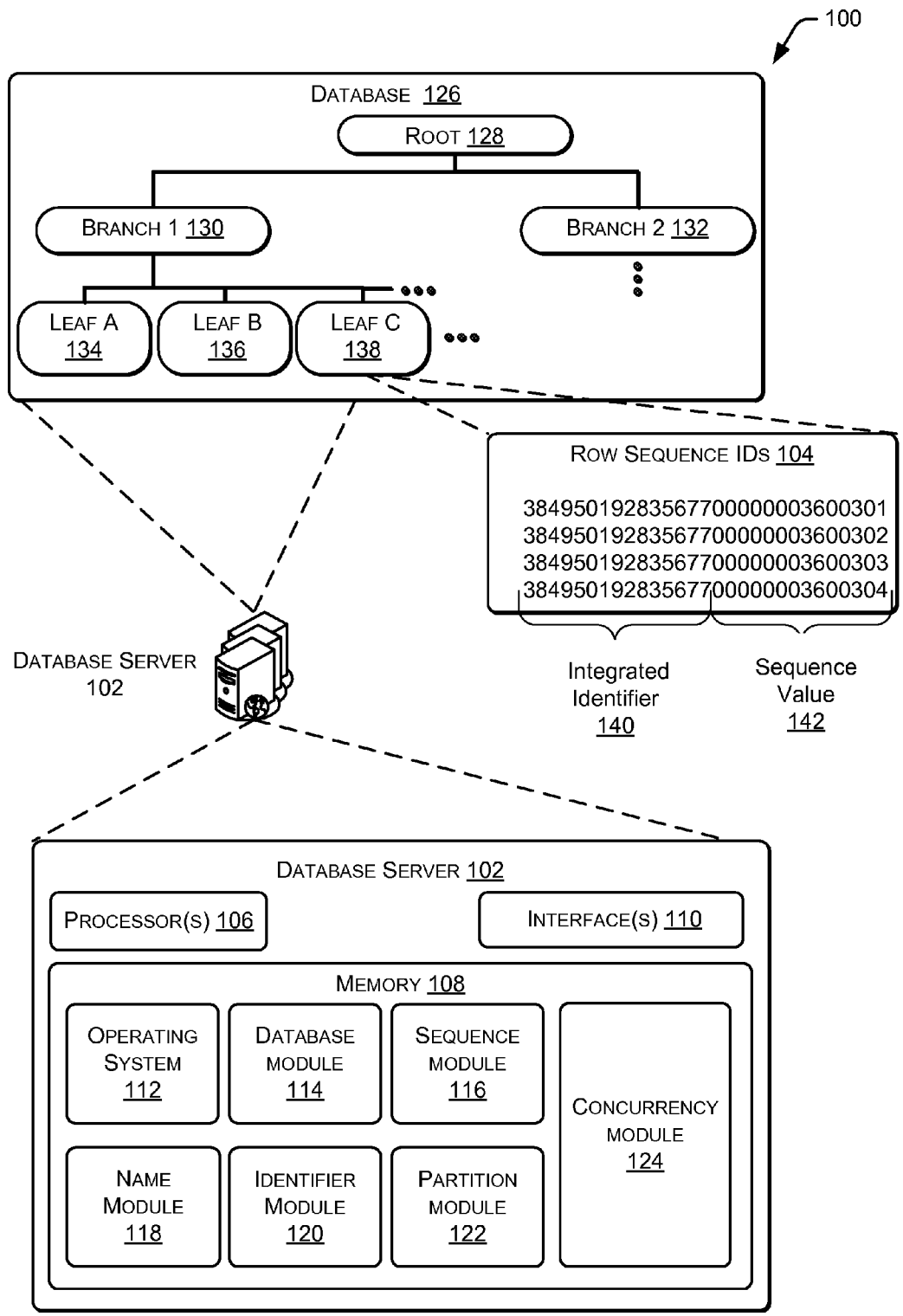
FIG. 1 illustrates a system for generating integrated identifiers for database records in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementatio

DETAILED DESCRIPTION

Described herein are systems and methods for mitigating index contention in a database based, at least in part, on monitoring for index contention and adding or decreasing the amount of concurrently accessed storage locations to prevent index contention.

Database management has increased in size and scope to account for the increased amount of online activity as the online realm reaches more users and offers more goods and services. Index contention issues arise when too many data records are attempting to be written to a single location within a database. This may be caused by incrementing database sequence values in a sequential manner. The incremental sequencing may lead to good cache locality and cache hit ratio, but may cause latency issues caused by having too many data records attempting to access the same database location.

The database server may monitor one or more storage locations to determine when index contention becomes an issue. The determination may be based on one or more database performance or efficiency characteristics that may include, but are not limited to, the amount of data records waiting to be written, the data record inserts per second, or the amount of memory used to store the data records before they are written to a storage location.

The database administrator may add additional storage locations to mitigate the index contention at the current storage locations (e.g., database leaf nodes). In certain instances, when the index contention is severe, the database administrator may add two or more additional storage locations to quickly mitigate the index contention issue. Also, as the database administrator usage decreases, the database server or administrator may decrease the amount of current storage locations.

This disclosure also describes systems and methods for generating unique identifiers for database records based, at least in part, on the database name and a database identifier that stores the records.

This disclosure also relates to generating unique identifiers for database records that may maintain a high probability of uniqueness as the number of databases expands within a network. In some instances, the database network may cover one or more business units, one or more services, and/or one or more regions or markets. Organizing or arranging the databases may be done in several different ways. In one embodiment, a distributed database architecture may be implemented to arrange and organize the databases within a network. The distributed database architecture may increase the number of databases in a lateral and/or vertical manner within a tiered hierarchy. The new databases may be given a new database name and a new database identifier and arranged within the distributed database architecture as needed. In some instances, the database identifier may be incorporated into the data record identifier for each of the data records stored within the database. The data record identifier may also include a sequence value that is unique within the database. In one embodiment, the database identifier may be modified to increase its probability of uniqueness. For example, the database name may be converted to a numerical representation of the name and may be hashed along with the database identifier. The hashing process may continue until reaching a significantly large number that exceeds or equals a predetermined threshold. In this way, incorporating or integrating several identifiers of varying uniqueness together to form an integrated identifier is likely to increase the probability of uniqueness for the database identifier. Therefore, duplicating a data record identifier will be less likely as the database grows, is cloned, or is copied.

Illustrative System

FIG. 1 illustrates a system 100 for generating database record identifiers in a way that will increase their uniqueness within a database network. The system 100 may include a database server 102 that manages one or more databases and their respective record identifiers 104. While a single database server 102 is shown, it is understood that the system 100 may include more than one database server 102 that are coupled to each other over a network.

The database server 102 may include one or more processors 106, a memory 108, and one or more interfaces 110 to communicate with additional content servers (not shown) and other devices (not shown) over a network (not shown).

The computer processors 106 may comprise one or more cores and are configured to access and execute (at least in part) computer-readable instructions stored in the one or more memories 108. The one or more computer processors 106 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The database server 102 may also include a chipset (not shown) for controlling communications between the one or more processors 106 and one or more of the other components of the database server 102. In certain embodiments, the database server 102 may be based on an Intel® architecture or an ARM® architecture and the processor(s) 106 and chipset may be from a family of Intel® processors and chipsets. The one or more processors 106 may also include one or more application-specific integrated circuits (ASICs) or application-specific standard products (ASSPs) for handling specific data processing functions or tasks.

The interfaces 110 may also comprise one or more communication interfaces (or network interface devices) to provide for the transfer of data between the database server 102 and another device directly such as in a peer-to-peer fashion, via a network, or both. The communication interfaces may include, but are not limited to: personal area networks ("PANs"), wired local area networks ("LANs"), wireless local area networks ("WLANs"), wireless wide area networks ("WWANs"), and so forth. The wireless system interfaces may include the hardware and software to broadcast and receive messages either using the Wi-Fi Direct Standard (See; Wi-Fi Direct specification published in October 2010) and or the IEEE 802.11 wireless standard (See; IEEE 802.11-2007, published Mar. 8, 2007; IEEE 802.11n-2009, published October 2009) or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical or other signals to exchange data between the database server 102 and another device such as an access point, a host computer, a server, a router, a reader device, another database server 102, and the like. The network may include, but is not limited to: the Internet, a private network, a virtual private network, a wireless wide area network, a local area network, a metropolitan area network, a telephone network, and so forth.

The one or more memories 108 comprise one or more computer-readable storage media ("CRSM"). In some embodiments, the one or more memories 108 may include non-transitory media such as random access memory ("RAM"), flash RAM, magnetic media, optical media, solid state media, and so forth. The one or more memories 108 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 108 may store an operating system 112 that includes a plurality of computer-executable instructions that may be implemented by the processor 106 to perform a variety of tasks to operate the interface(s) 110 and any other hardware installed on the database server 102. The memory 108 may also include: a database module 114, a sequence module 116, a name module 118, an identifier module 120, a partition module 122, and a concurrency module 124.

The database module 114 may store, manage, and organize any or all databases within the database server 102 or within a network of database servers (not shown). The types of databases may include, but are not limited to: a hierarchical database, a relational database, an active database, a cloud database, a distributed database, and/or any other type of database that is organized to store data. The database module 114 may include a database management system that manages the creation, maintenance, and use of the database. This may include, but is not limited to, security, data integrity, concurrency control, data recovery, and/or queries. In one embodiment, the database module 114 may implement a b-tree data structure as shown in database 126 in FIG. 1.

Generally, a b-tree data structure may comprise a root 128, one or more branches 130, 132, and one or more leaves per branch (e.g., leaf A 134, leaf B 136, and leaf C 138). In this simplified example, the data may be stored at leaves in rows that are accessible and managed by the database management system. In one embodiment, this may be accomplished by using row identifiers 104 that may include an integrated identifier 140 and a sequence value 142 that are associated with a data record (not shown). The combination of the integrated identifier 140 and the sequence value 142 may be used to provide a unique value that the database management system may use to track, access, or manage the data within the leaf C 138 or the database 126. For example, a unique sequence value 142 may be associated with each data record in the leaf C 138. In this way, the sequence values 142 may provide a way to distinguish between the data stored within the leaf C 138. In this embodiment, the sequence values may be sequential as shown in the illustrated row identifiers 104 (e.g., ... 01, ... 02, ... 03). However, the row identifiers 104 may also be easily distinguishable from data stored in other leaves 134, 136, the other branch 132, and other databases (not shown) managed by the database server 102. The integrated identifier 140 may provide a unique value that would be distinguishable over other row identifiers that may be used by the database 126 or any other database managed by the database server 102. Accordingly, the uniqueness of the integrated identifier 140 may be based on, but not limited to, the number of digits and how the number is derived. In one embodiment, the integrated identifier 140 may be at least 10^15 to provide enough latitude to create unique identifiers for a very large sample of data records. The values of the integrated identifier 140 may also be critical to generating unique values to fill the 10^15 space. In one embodiment, the integrated identifier 140 may be based in part on the several components that may be integrated into a single value. For example, the database 126 may include an identifier that may be based on a large number that may be based on a time and/or date that the database was created. This number may be randomly generated and may be cross referenced against existing identifiers to ensure that the number is unique to the system 100. However, the uniqueness of the identifier may be improved by incorporating additional unique elements into the integrated identifier 140. For example, the name of the database may also have unique characteristics, in that the database server 102 may attempt to use different names for the databases that it manages. Therefore, by combining the two or more unique (or semi-unique) properties of the database into an integrated identifier 140, the row identifier's probability of being unique may increase. The higher the probability of uniqueness will make it less likely for the database server 102 (or another database server) to generate a duplicate row identifier. The integrated identifier 140 will be discussed in greater detail below in FIG. 2 and the identifier module 120.

The sequence module 116 may generate sequence values 142 that may be unique within each database 126, branch 130, 132, and/or leaves 134, 136, 138. In this way, the sequence values may distinguish between identifiers within a group or subset of data records. For example, the sequence values 142 may be unique for each data record in the leaf C 138. In one embodiment, the sequence values 142 may be sequential, as shown in FIG. 1. However, the sequence values may be incremented or sequenced in a variety of ways as long as they are not duplicated within certain group data records or a subset of the group data records. For example, the sequence values may 142 be incremented in a systematic way (e.g., by 1, 2, 3 ... or "n" increments) or randomly (as needed) as long as they are not duplicated within their designated group.

The name module 118 may generate names for the databases or the components of the databases (e.g., branches 130, 132 or leaves 134, 136, 138). Generally, the names may also have a probability of uniqueness in order to distinguish them from each other. For example, the names may be numeric or alphanumeric, and may follow a naming scheme set by the service owners. The names may also reference the type of data being stored (e.g., sales, billing, customer, product information), the origin of the data (e.g., region name, business name), an iteration of the number of related databases, and/or any other property or characteristic associated with the data. For example, the database 126 may be named customer3EU meaning that it is the third customer database for the European Union region which may be differentiated from the customer1EU and the customer2EU databases.

The name module 118 may also convert the alphanumeric or text database names into a numeric format that may be more easily combined with the other values that may be used to generate the integrated identifier. In one embodiment, the database name may be converted to a different format using the American Standard Code for Information Interchange values. However, any other conversion or encoding scheme may be used to convert the database name if the conversion is needed. In some embodiments, the database name may not be converted. Following the conversion, the new string or name may be incorporated into the integrated identifier 140.

The identifier module 120 may generate the identifier for each database and the integrated identifier 140 by incorporating other unique features or properties related to the database 126 (e.g., the database name). The identifier may incorporate a probability of uniqueness that enables the database server 102 to distinguish between each of the databases within the system 100. For example, the identifier may incorporate the time (or the day) in which the identifier was created. The time or day may be used based (at least in part) on the frequency of database generation. For example, the time stamp or interval may be able to delineate between each database such that the databases may indicate a different time for each database. This may be done in second, minute, or sub-second intervals depending on how fast the database server 102 may generate identifiers. In addition to the time stamp, additional properties may also be incorporated into the identifier. For example, the time stamp may be appended by an incremented value that may indicate how many databases may have been created within a certain time window. The additional value may indicate that the identifier was for the "xth" database created within a certain time window. The time window may include a 12 or 24 hour period (or any other period that may be useful) based on the number of databases being created. For example, the identifier may have been created at noon on Oct. 10, 2012 and has the time/date stamp 1010121200. The identifier may have been for the 256$^{th}$ database created on that day. Hence, the time/date stamp may be modified to 1010121200256. Once the identifier has been determined, it may be combined with other components of the integrated identifier 140.

In one embodiment, the identifier may be combined with the database name to generate the integrated identifier 140. The identifier module 120 may hash the identifier and the database name to a single value that forms the integrated identifier 140. The hashing process should lead to a sufficiently large integrated identifier 140 to impart a high level of uniqueness. For example, the integrated identifier 140 may be at least 10^15 digits. The hashing process may include, but is not limited to, string hashing, cryptographic hashing, or geometric hashing.

The partition module 122 may generate clones or copies of existing databases in conjunction with the database module 114. A database may be cloned for its data structure rather than for the data itself. For example, if it is desired to add a new shard (e.g., a new partition) to a database, the database may be cloned to help ensure that all of the data structures (e.g., tables, indexes, and privileges) are identical. In certain embodiments, the actual data (e.g., transactional data) is not kept when cloning a database for the purpose of adding a new shard. Databases may be cloned to create backups for maintaining data integrity during database server 102 upgrade, or when one or more database servers are unavailable due to maintenance or unplanned disruptions. A new or cloned database created from an existing database may receive a new database identifier, a new name, and a new integrated identifier. However, the cloned database may continue to use the same sequence value 142 scheme of the original database. The partition module 122 may select a database for cloning and then ensure that the cloned database has a new name from the name module 118, a new identifier, and a new integrated identifier from the identifier module 120 before being released for use. The new databases may be added horizontally to the existing database structure and may increase the amount of existing databases. This horizontal partitioning may also be referred to as sharding (e.g., where shards correspond to partitions). For example, leaf B 136 may have been sharded (or horizontally partitioned) to generate leaf C 138. The partitioning process will be described in greater detail in the description of FIG. 3A below.

The concurrency module 124 may generate concurrency values (not shown in FIG. 1) that may mitigate index contention in the database 126. Index contention may pertain to issues that arise when the database server 102 attempts to write or insert data into the same index block (e.g., leaf C 138). Index contention may increase database server 102 transaction latencies that limit the speed of the database server 126 and the servers or devices that use the database server 102. Accordingly, the scalability of the database server 102 may be limited based on index contention issues that may result in using more equipment to support database operations. This index contention issue may also be referred to as a hot spot, which represents an increase in the buffer size that stores data that is waiting to be written into the database 126. The hot spot may be quantified in a way that indicates the severity or impact of the index contention on database operations. For example, a hot spot may be quantified in terms of memory size of the items waiting to be written into the database. In another embodiment, the hot spot may be quantified by the amount of data records inserted into the database 126 per second. In another instance, the hot spot may quantified by the amount of records or items that are waiting to be written into the database 126.

Hot spot quantification may be used to determine when additional hot spots may be implemented to mitigate the impact of index contention on database operations. Threshold limits may be established to trigger when and how many hot spots (e.g., different database locations) may be implemented. The database server 102 may implement several threshold strategies that enable adding or subtracting the number of hot spots based on database 126 performance. For example, additional hot spots may be implemented to write data when the memory size of the buffers that store data waiting to be written into the database 126 exceeds a certain memory size or amount. In another instance, additional hot spots may be implemented when a transaction rate associated with the database increases beyond a threshold amount. In one embodiment, the transaction rate may include the number of data records that are being inserted/written per second into the database 126. In another embodiment, a new hot spot may be added based on the number of data records that are waiting to be written into the database. In another embodiment, a new hot spot may be added based on the time it takes add a new data record to the database 126. In another embodiment, hot spots may be managed based on the efficiency of memory usage within the database 126 to store data records. In each of these threshold embodiments, the threshold amounts may also involve implementing more than one hot spot at one time. For instance, a threshold strategy may include a plurality of threshold triggers that may add or subtract hot spots. A first trigger strategy may incrementally add hot spots with increasing quantifiable measurements of index contention. This may include adding or removing hot spots on a linear relationship with the quantifiable measurements (e.g., memory size or transaction rate). In another instance, adding hot spots may be based, at least in part, on a non-linear relationship with the quantifiable measurements. A second trigger strategy may incorporate a combination of quantifiable measurements to trigger the addition or subtraction of hot spots. For example, a hot spot may be added or removed based, at least in part, on a relationship between the number of inserts per second and the memory size of the items waiting to be stored in the database 126. In this case, a hot spot may be modified based, at least in part, on achieving a quantifiable threshold value for both inserts per second and memory size. For example, this may also include using more than one threshold trigger at a time to manage the amount of hot spots. It may also include modifying the number of hot spots based on quantifiable measurements of different threshold triggers. For example, a new hot spot may be added based on an inserts per second trigger or a memory size trigger, such that both threshold triggers add new hot spots independently from each other.

Hot spots may also be added or subtracted based, at least in part, on historical performance or usage of the database 126. The database server 102 may record usage over a period of time and may develop trends to predict when usage may increase or decrease. For example, database 126 usage may predictably increase or decrease during a time of the day, month, or year. The concurrency module 124 may proactively add or subtract hot spots based on these predictions without referencing the quantifiable threshold triggers referenced in the previous paragraph.

The concurrency module 124 may manage or control the flow of data to the hotspots using concurrency values (not shown in FIG. 1; see FIG. 6 for additional details) that may be incorporated into the row sequence IDs 104. A first hot spot may comprise a database location in leaf C 138 that stores data received from the database module 114. The hot spot may be referenced or identified in the row sequence ID 104 using a string of one or more digits that may include integers, letters, or a combination thereof. In one specific embodiment, the string may include three numerical digits that may be inserted between the integrated identifier 140 and the sequence value 142. When one of the threshold triggers is achieved, the concurrency module 124 may add a second hot spot comprising a location in leaf B 136. The second hot spot may be represented by another string that is different or distinguishable from the first hot spot identifier. The second hot spot string may be incorporated into a row sequence ID (not shown) that may be used in leaf B 136 instead of leaf C 138. In this way, the concurrency module 124 may manage the use of hot spots to mitigate database 126 index contention issues. The use of concurrency values (and some exemplary embodiments) will be described in greater detail in the description of FIG. 6. Additional embodiments that also incorporate the integrated identifier 140 and a time stamp into the database row identifiers or record identifiers (or row sequence IDs 104) will be described in greater detail in the descriptions of FIGS. 7 and 8.

Figure 2A:
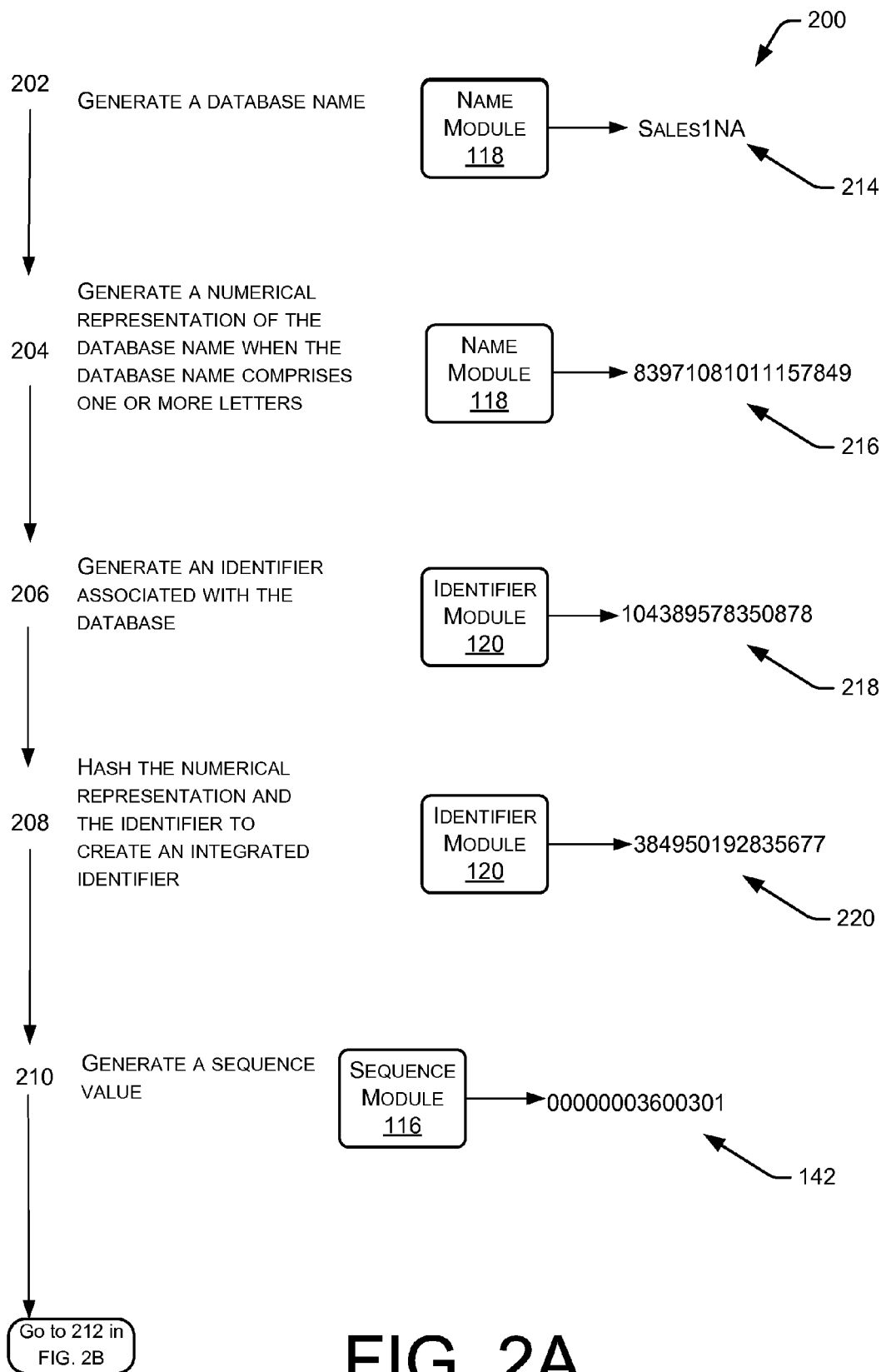
FIGS. 2A-2B illustrates a flow diagram with accompanying illustration of a method for generating integrated identifiers for database records in accordance with one or more embodiments of the disclosure.
Figure 2B:
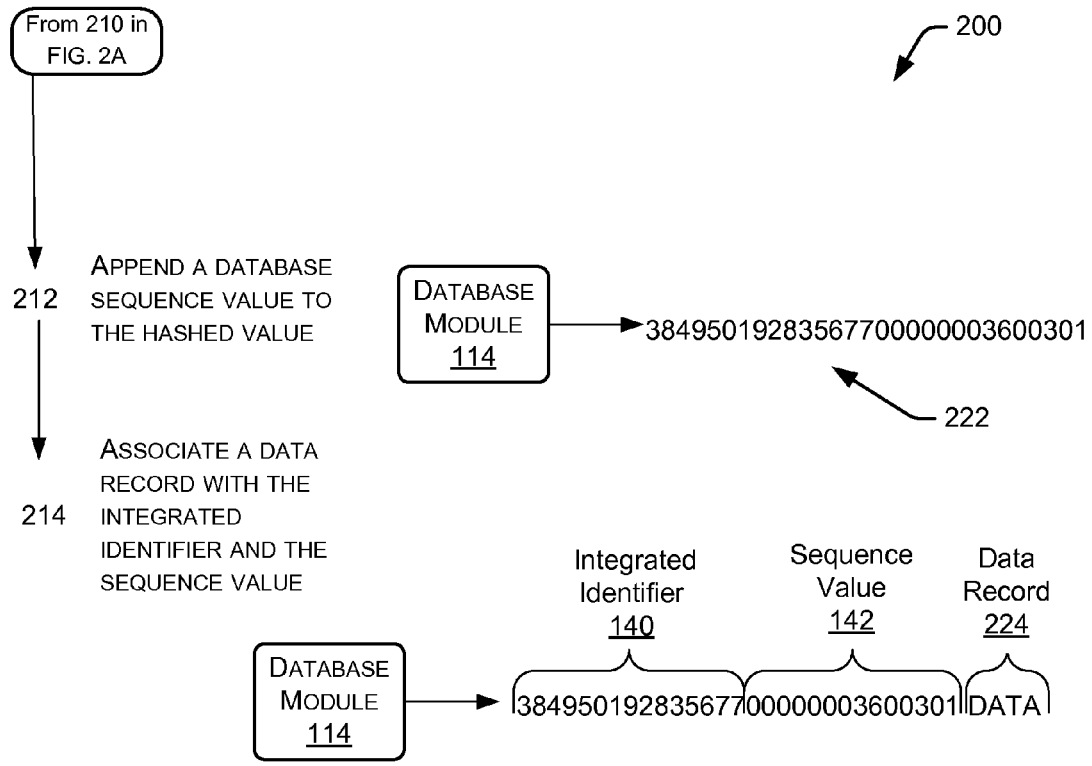

FIGS. 2A and 2B illustrate a flow diagram with accompanying illustrations of a method 200 for generating unique row identifiers 104 for a database 126 using a database name 216 and a database identifier 218 to generate an integrated identifier 140. The integrated identifier 140 may be "globally unique" across the databases managed by the database server 102. "Globally unique" may mean that there is a very small likelihood that the database server 102 may generate a duplicate integrated identifier 140. The method 200 illustrates one embodiment of how to generate an integrated identifier 140. It should be noted that in other embodiments the sequencing of the method 200 may be altered and some steps may be omitted.

At block 202, the name module 118 may generate a database name 214 when the database module 114 determines a new database is needed. The name may follow any naming protocol selected by the service owner and may include: a reference to the type of data, the origin of the data, the hierarchy of the database, or the purpose of the data. For example, the name 214 may be Sales1NA indicating that the new database may be the first sales database for the North American region. Although this embodiment indicates the database name 214 may be an alphanumeric value, the naming convention may include only numbers or may include any other symbol or mark.

At block 204, the naming module 118 may convert the alphanumeric name 214 to a combination 216 of American Standard Code for Information Interchange (ASCII) code, characters, or values. However, the name module 118 may convert the name 214 to any appropriate format that is conducive to hash or to combine with other values that may be incorporated into the integrated identifier 140.

At block 206, the identifier module 120 may generate an identifier 218 for the new database. The identifier 218 may include any value, character, or symbol that may be hashed with or combined with any other strings that may be used to generate the integrated identifier 140. In one specific example, the identifier 218 may include the value 104389578350878.

At block 208, the identifier module 120 may hash the identifier 218 and the name 216 to generate the integrated identifier 140. The hashing process may include any hashing technique preferred by the service owner. The hashing techniques may include, but at are not limited to, string hashing or geometric hashing. In one embodiment, the integrated identifier 140 should be a string or value with at least 15 digits. In one specific embodiment, the integrated identifier 220 may be 384950192835677.

At block 210, the sequence module 116 may generate a sequence value 142 that may be used to distinguish rows within a database. The sequence values 142 may be sequential, as shown in FIG. 1. However, the sequence values 142 may be incremented or sequenced in a variety of ways as long as they are not duplicated within certain group data records or a subset of the group data records. For example, the sequence values may be incremented in a systematic way (e.g., by 1, 2, 3 . . . or "n" increments) or randomly (as needed) as long as they are not duplicated within their designated group.

At block 212, the database module 114 may receive a sequence value 142 or a sequence scheme from the sequence module 116. The database module 114 may append the sequence value 142 to the integrated identifier 220. It may also generate a sequence value 142 in view of the sequence scheme and append the sequence value 142 to the integrated identifier 220 to form a row identifier 222 for the database 126. In one specific embodiment, the row identifier 222 may be 384950192835677000000003600301.

At block 214, the database module 114 may assign a data record 224 to the row identifier 222. The data record 224 may be any type of information or data that may be stored in a database 126.

FIG. 3A illustrates a flow diagram with accompanying illustration of a method 300A for cloning a database 126 and incorporating a new integrated identifier 308 into a cloned database 310A derived from an existing database 312A. In general, the cloned database 310A may need the new integrated identifier 308 to prevent duplicating identifiers between the new and old databases. This may be especially important if the cloned database 310A intends to use the same sequencing scheme as the existing database 312A. Method 300A may also apply to new databases that are copied or replicated from an existing database. Cloning, copying, or replicating databases may be done to provide data integrity for existing databases, to add additional storage capacity, or increase transactional throughput.

At block 302A, the existing database 312A may be cloned to create a cloned database 310A that at least includes, but is not limited to, the row identifiers and their associated data records. The cloned database may also be copied, replicated, or subjected to any other technique in which the row identifiers and data records are transferred to another database. The database module 114 may receive the new name (e.g., Sales2NA) from the name module 118. The name may be generated based (at least in part) on a naming scheme stored at the database module 114 or the name module 118. The identifier module 120 may also generate another identifier that is associated with the database. In one embodiment, the identifier may be a database identifier that the database module 114 may use to differentiate the cloned database from other databases 126, 312A.

At block 304A, the identifier module 120 may generate an integrated identifier 308 based, at least in part, on the database name and the database identifier. In another embodiment, the integrated identifier 308 may be generated based, at least in part, on the database name, the database identifier, and a hashing process similar to the one described above in the description of FIGS. 1 and 2. In one specific embodiment, the integrated identifier 308 may be 657683465538349 using the database name, the database identifier, and the hashing process.

At block 306A, the database module 114 may associate new data records 314 to the cloned database 310A, which is illustrated at the lower right-hand portion of FIG. 3A. The new data records 314 may be appended to the cloned data records 316 and may use the same sequencing scheme as the existing database. The existing database 312A may also be populated with additional records 318 (see the lower left-hand portion of FIG. 3A) that still use the existing integrated identifier 140 that was associated with the old records 320 that were present prior to cloning.

FIG. 3B illustrates a flow diagram with accompanying illustration of a method 300B for cloning a database 126 and incorporating a new integrated identifier 308 into a cloned database 310B. However, in this embodiment, the old data records 320 may not be incorporated into the cloned database 310B. In general, the cloned database 310B may need the new integrated identifier 308 to prevent duplicating identifiers between the new and old databases. This may be especially important if the cloned database 310B intends to use the same sequencing scheme as the existing database 312B. Method 300B may also apply to new databases that are copied or replicated from an existing database. Cloning, copying, or replicating databases may be done to provide data integrity for existing databases, to add additional storage capacity, or increase transactional throughput.

At block 302B, the existing database 312B may be cloned to create a cloned database 310B that at least includes, but is not limited to, the row identifiers and their associated data records. The cloned database may also be copied, replicated, or subjected to any other technique in which the row identifiers and data records are transferred to another database. The database module 114 may receive the new name (e.g., Sales2NA) from the name module 118. The name may be generated based (at least in part) on a naming scheme stored at the database module 114 or the name module 118. The identifier module 120 may also generate another identifier that is associated with the database. In one embodiment, the identifier may be a database identifier that the database module 114 may use to differentiate the cloned database from other databases 126, 312B.

At block 304B, the identifier module 120 may generate an integrated identifier 308 based, at least in part, on the database name and the database identifier. In another embodiment, the integrated identifier 308 may be generated on the database name, the database identifier, and a hashing process similar to the one described above in the description of FIGS. 1 and 2. In one specific embodiment, the integrated identifier may be 657683465538349 using the database name, the database identifier, and the hashing process.

At block 306B, the database module 114 may associate newer data records 322 to the cloned database 310B, which is illustrated at the lower right-hand portion of FIG. 3B. In this instance, the cloned database 310B may include the properties or characteristics of the existing database 312B, but may not include the old records 320. The newer data records 322 may be added to the cloned database 310B as needed. The newer data records 322 may use the same sequencing scheme as the existing database 312B or a new sequencing scheme. The existing database 312B may also be populated with additional records 318 (see the lower left-hand portion of FIG. 3B) that still use the existing integrated identifier 140.

Figure 4:
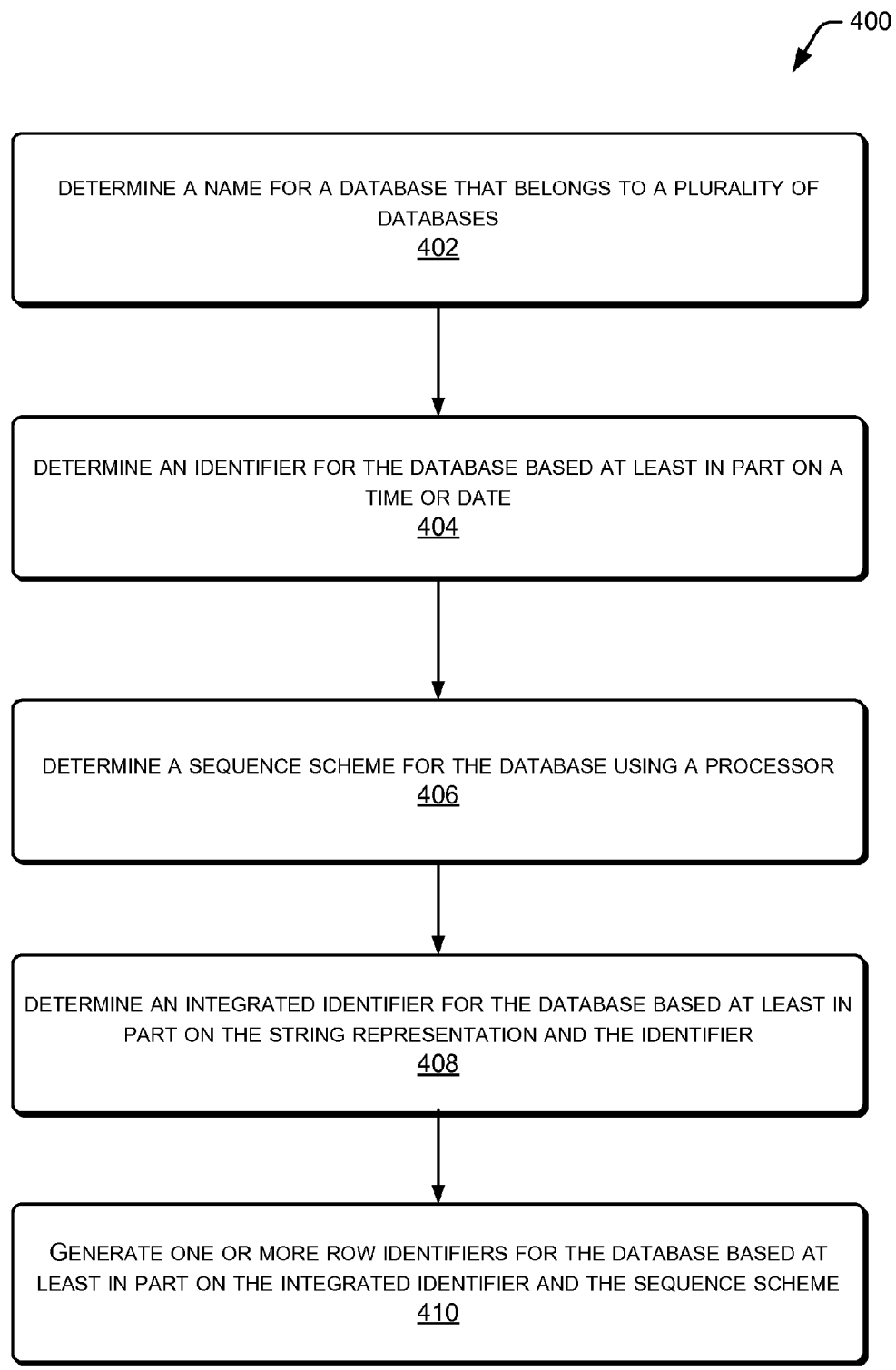
FIG. 4 illustrates a flow diagram for a method for generating integrated identifiers for database records in accordance with one or more embodiments of the disclosure.

FIG. 4 illustrates a flow diagram for a method 400 for generating integrated identifiers 140 (FIG. 1) to be used as row identifiers 104 for a data record 224 (FIG. 2B). Method 400 is directed from the point of view of the database server 102 and its module components. In general, the databases may use an identification convention that enables the database server 102 to locate discrete data records using a single identifying feature. The identifying feature may be a combination of the integrated identifier 140 with a sequence value 142. In the combination embodiment, the integrated identifier 140 may have a strong probability of uniqueness among the identifiers of the other databases, and the sequence value may have a strong probability of uniqueness within the database itself. In this way, the combination minimizes the likelihood of a duplicate identifier even if the data record 224 is moved between different databases.

At block 402, the name module 118 may determine a name for a database that belongs to a plurality of databases managed by the database server 102. The database may be a new database being created to add additional storage capacity, processing capacity, memory capacity, and/or throughput capacity for the databases managed by the database server 102. The databases may be arranged in any database architectural framework.

At block 404, the identifier module 120 may determine an identifier 218 (FIG. 2A) for the database based, at least in part, on a time or date associated with the database or the identifier. For example, the time or date may relate to the creation of the database or the identifier 218. The identifier may have a relatively high probability of uniqueness between the other database identifiers associated with the database server 102 or the plurality of databases.

At block 406, the sequence module 116 may select a sequence scheme for the database. The scheme may comprise one or more strings or numbers that have a relatively high probability of uniqueness to each other. The uniqueness may be based upon the number of digits (or letters) and their arrangement with respect to each other. For example, the number of digits or letters may be greater than 10.

At block 408, the identifier module 120 may generate or determine an integrated identifier 140 for the database. The integrated identifier 140 may comprise a combination of the identifier 218 and the name 216. In one embodiment, the combination may be done by appending the identifier 218 and the name 216 together. In another embodiment, the identifier 218 and the name 216 may be hashed to generate a sufficiently large number that comprises a relatively high probability of uniqueness with other integrated identifiers. In one specific instance, the number of digits of the integrated identifier may be at least ten. The hashing process may be completed by any type of hashing technique. In one specific embodiment, the hashing process may include a string hashing technique or a geometric hashing technique.

At block 410, the database module 114 may generate one or more row identifiers 104 based, at least in part, on the integrated identifier 140 and a sequence value 142. The database module 114 may assign individual data records 224 to each of the row identifiers 104. In this way, the database server 102 may be able to distinguish between data records 224 regardless of which database (or sequence within the database) where the data records 224 may be stored.

Figure 5:
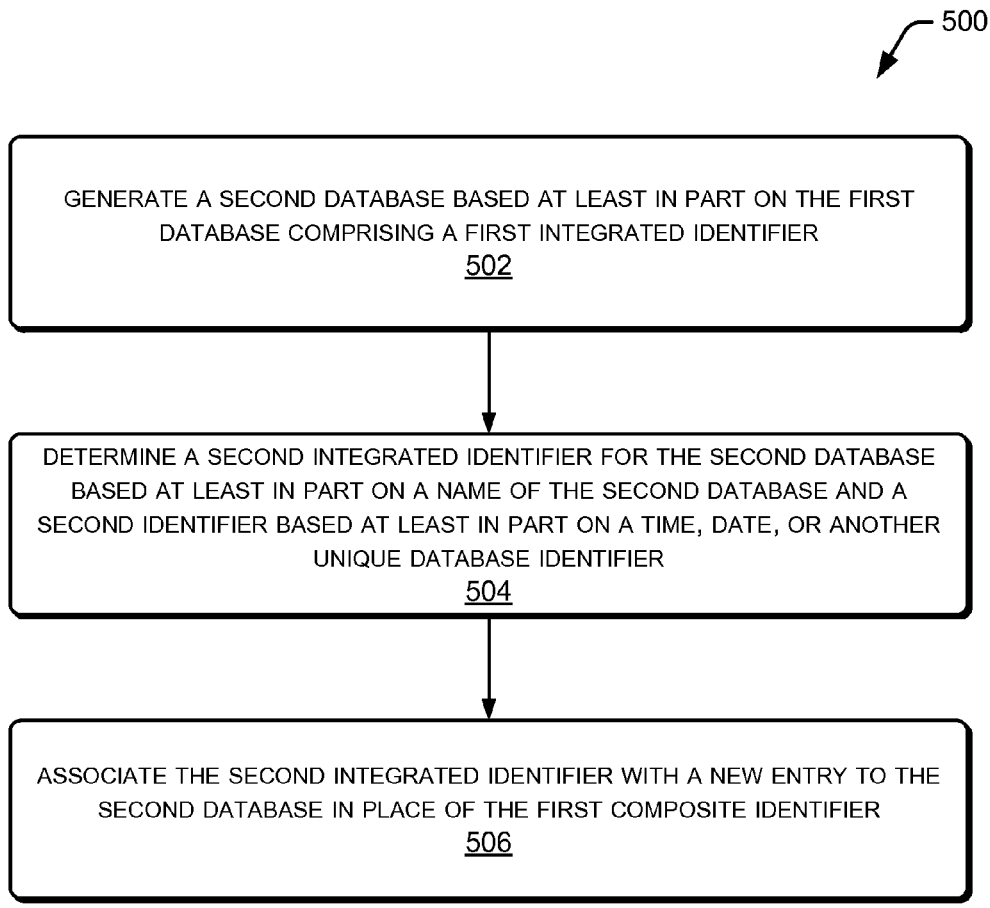
FIG. 5 illustrates a flow diagram for a method for generating integrated identifiers for a cloned database in accordance with one or more embodiments of the disclosure.

FIG. 5 illustrates a flow diagram for a method 500 for generating integrated identifiers 308 for a cloned database (e.g., 310A and 310B of FIGS. 3A and 3B, respectively) based, at least in part, on an existing database (e.g., 312A and 312B). As noted above in the description of FIGS. 1 and 3, the cloned database may be generated for maintaining backups for data integrity purposes or to decrease the relative size of existing databases by adding additional databases. In method 500, the first database is an existing database (e.g., 312A and 312B).

At block 502, the database module 114 may generate a second database (e.g., 310A and 310B) either by copying, cloning, replicating, or transferring data from the first database. The second database may also be given a name and an identifier that is different from the first database or the plurality of databases. The identifier may also be based on a time or date associated with the second database or the identifier. The first database may include a first integrated identifier 140 similar to the one described in the description of FIG. 4.

At block 504, the identifier module 120 may generate a second integrated identifier 308 for the second database. The second integrated identifier 308 may be a string of digits or information similar to the first integrated identifier 140.

At block 506, the database module 114 may add new data records 314 to the second database 310. The new data records 314 may be associated with a row identifier that comprises the second integrated identifier 308 (located in the lower right portion of FIG. 3A) and a unique sequence value in database 310A. The cloned or copied data records 316 may remain unedited and may continue to be referenced by the database server 102. This may be accomplished based in part on the integrated identifier 140 having a relatively high probability of uniqueness that does not require to be updated when a data record is moved from the first database to the second database.

Figure 6:
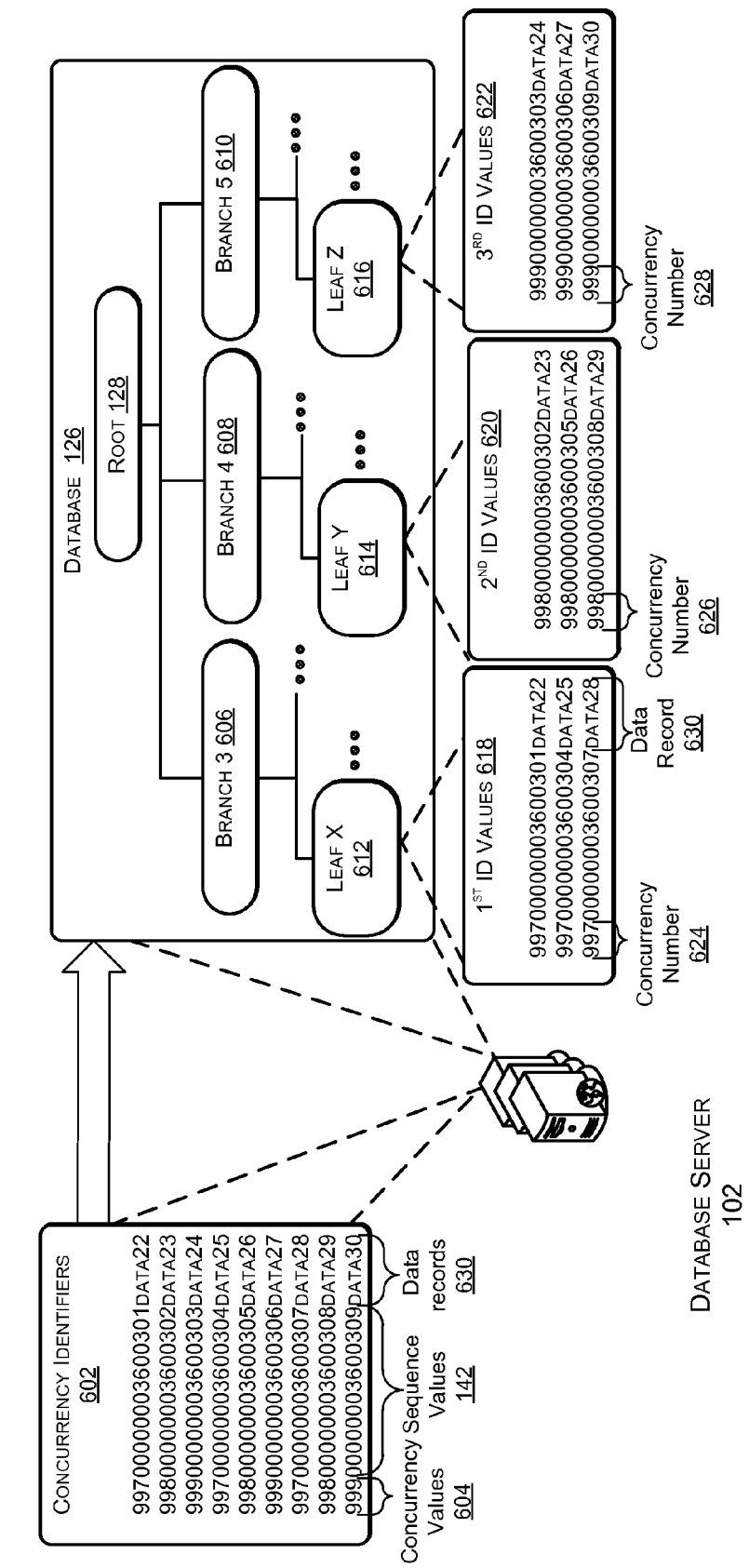
FIG. 6 illustrates an embodiment for managing index contention issues using concurrency values in database row identifiers in accordance with one or more embodiments of the disclosure.

FIG. 6 illustrates one embodiment 600 for using concurrency identifiers 602 to mitigate index contention issues in a database 126. In this embodiment 600, the concurrency module 124 may work in conjunction with the sequence module 116 to generate concurrency identifiers 602 that may include concurrency values 604, sequence values 142, and data records 630. The concurrency values 604 may represent or identify a database location (e.g., a hot spot) where the database server 102 is storing data. The sequence values 142 may or may not comprise unique values within the database 126.

The sequence values 142 may be generated randomly or sequentially as indicated above in the description of FIG. 1. The sequence values 142 (in this embodiment 600) are incremented in a sequential order (e.g., 301, 302, . . . 309) and all of the sequence values 142 are unique from each other regardless of the concurrency value 604. However, in other embodiments, the sequence values 142 may be randomly generated, and they may not be unique within a given sample set. For example, more than one concurrency identifier 602 may share the same sequence value 142, but the concurrency identifiers 602 may have different concurrency values 604 that enable the database server 102 to distinguish between the two concurrency identifiers 602. In this way, the sequence values 142 for a first hot spot (e.g., leaf X 612) may be distinguishable from each other, but the sequence values 142 in other hot spots (e.g., leaf Y 614, leaf Z 616) may be the same value. In yet another embodiment, the sequence values 142 within a hot spot (e.g., leaf X 612) may be the same value, but the concurrency identifier 602 may include another string (e.g., time stamp value—not shown) that may impart a degree of uniqueness that enables the database server 102 to distinguish between the two concurrency identifiers 602. The data records 630 may include any type of electronic data or information that may be stored in a database. This may include, but is not limited to, customer information, product information, or sales information. In one embodiment, the data may include a pointer to data that is stored in another location in the database 126 or another database. In one embodiment, the data records 630 may each be different content types as indicated by the sequential numbering (e.g., data 22, data 23, data 24). Although the data records 630 are capable of different types of data, this does not preclude their ability to store the same information in one or more of the data records 630.

In this embodiment 600, the concurrency values 604 include three different strings that represent three different database locations for storing data. The first database location may be represented by the 997 string, the second database location may be represented by the 998 string, and the third database location may be represented by the 999 string. The concurrency values 604 alternate or repeat as new concurrency identifiers 602 are generated. In this embodiment 600, the first concurrency identifier 602 uses 997, the second concurrency identifier uses 998, and the third concurrency identifier uses 999. As shown in FIG. 6, the concurrency values 604 repeat the 997, 998, and 999 sequencing for the next three concurrency identifiers 602. In other embodiments, the sequencing of the concurrency values 604 may use a reverse sequential order or a random order when generating concurrency identifiers 602. The concurrency module 124 may regulate the order or usage of the concurrency values 604 to control the distribution data within the database. As noted above, the concurrency module 124 may increase or decrease the amount of hot spots as needed. The concurrency identifiers 602 may be associated with a data record (not shown) and then sent to the database 126 to be stored in its designated location (e.g., hot spot).

The database 126 may be part of a horizontally partitioned or sharded structure that includes a root 128 with several branches (e.g., branch 3 606, branch 4 608, and branch 6 610). The branches 606, 608, 610 may include one or more leaves that may store data records using the concurrency identifiers 602 to identify and manage individual data records within the database 126. In this embodiment 600, the database 126 may include leaf X 612, leaf Y 614, and leaf Z 616 as hot spots that include record identifiers or ID values to organize the data within the hot spot. For example, leaf X 612 may include the first hot spot ID values 618, leaf Y 614 may include the second hot spot ID values 620, and leaf Z 616 may include the third hot spot ID values 622. The concurrency identifiers 602 that include the 997 concurrency number 624 are stored in leaf X 612. The concurrency identifiers 602 that include the 998 concurrency number 626 may be stored in leaf Y 614. The concurrency identifiers 602 that include the 999 concurrency number 628 may be stored in leaf Z 616. A data record (not shown) may be associated with each of the concurrency identifiers 602 stored in the database 126.

Figure 7:
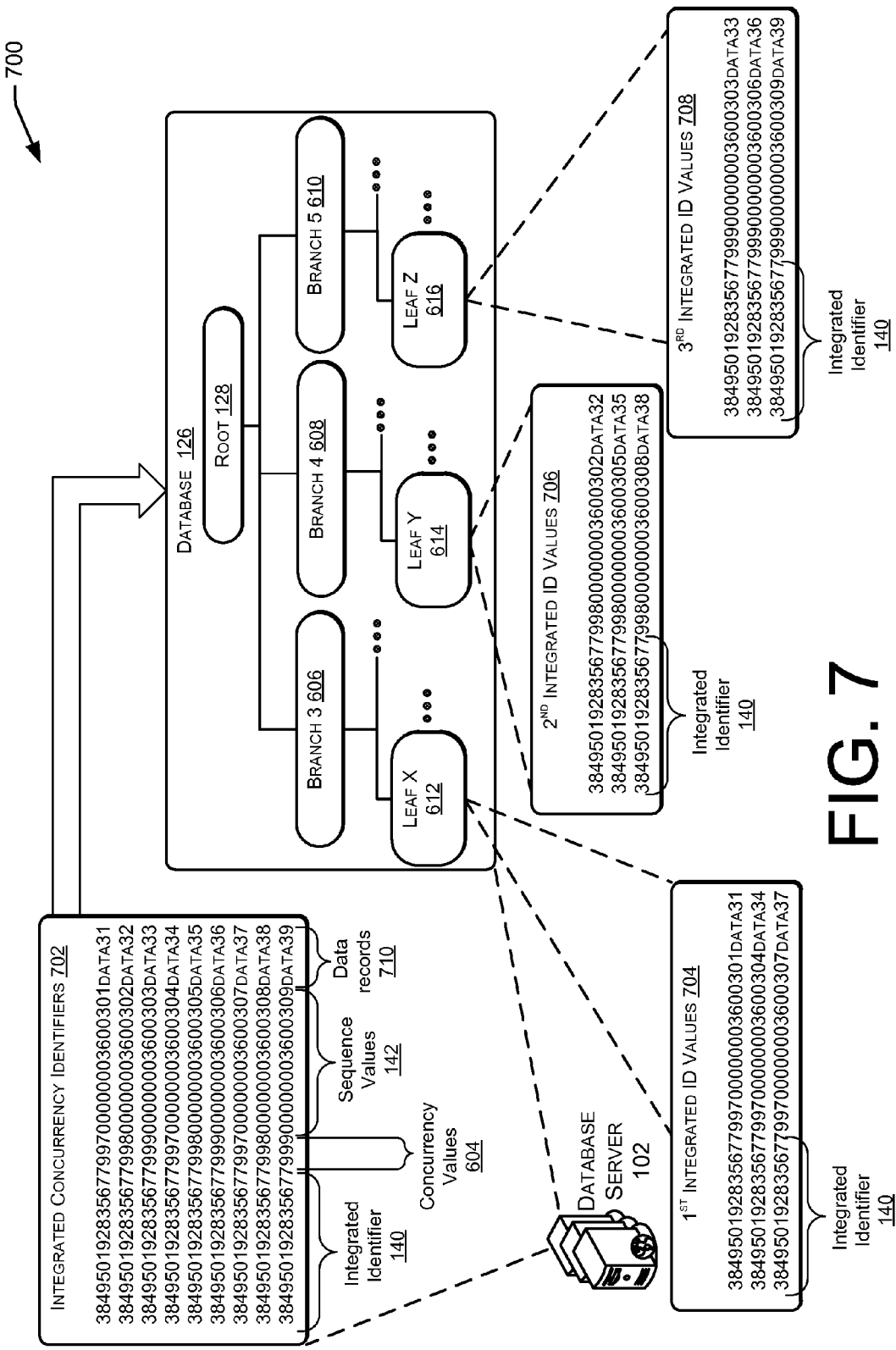
FIG. 7 illustrates an embodiment for managing index contention issues using concurrency values and integrated identifiers in database row identifiers in accordance with one or more embodiments of the disclosure.

FIG. 7 illustrates one embodiment 700 for using concurrency identifiers 602 and integrated identifiers 140 to generate an integrated concurrency identifier 702 to mitigate index contention issues in the database 126. In this embodiment 700, the integrated concurrency identifiers 702 may be arranged by prepending a concurrency value 604 to sequence value 142 and prepending an integrated identifier 140 to the concurrency value 604. Data records 710 may also be appended to the sequence values 142. In other embodiments, the four elements of the integrated concurrency identifier 702 may be prepended or arranged in any order. As noted above in the description of FIG. 2A, the integrated identifier 140 may be generated using a hashing or a numerical representation of the database name 216 and a database identifier 218 to generate a large value (e.g., 15 digit long string). The integrated identifier 140 may have a strong probability of uniqueness among the identifiers of the other databases and the sequence value may have a strong probability of uniqueness within the database 126 itself. In this way, the combination minimizes the likelihood of a duplicate identifier being generated by the database server 102.

In this embodiment 700, the concurrency module 124 may route the integrated concurrency identifiers 702 to one or more hot spots based on the corresponding concurrency value 604. For example, the integrated concurrency identifiers 702 that include the 997 concurrency value 624 (e.g., $1^{st}$ integrated ID values 704) may be stored in the first hot spot (e.g., leaf X 612), the integrated concurrency identifiers 702 that include the 998 concurrency value 626 (e.g., $2^{nd}$ integrated ID values 706) may be stored in second hot spot (e.g., leaf Y 614), and the integrated concurrency identifiers 702 that include the 999 concurrency value 628 (e.g., $3^{rd}$ integrated ID values 708) may be stored in third hot spot (e.g., leaf Z 616).

Figure 8:
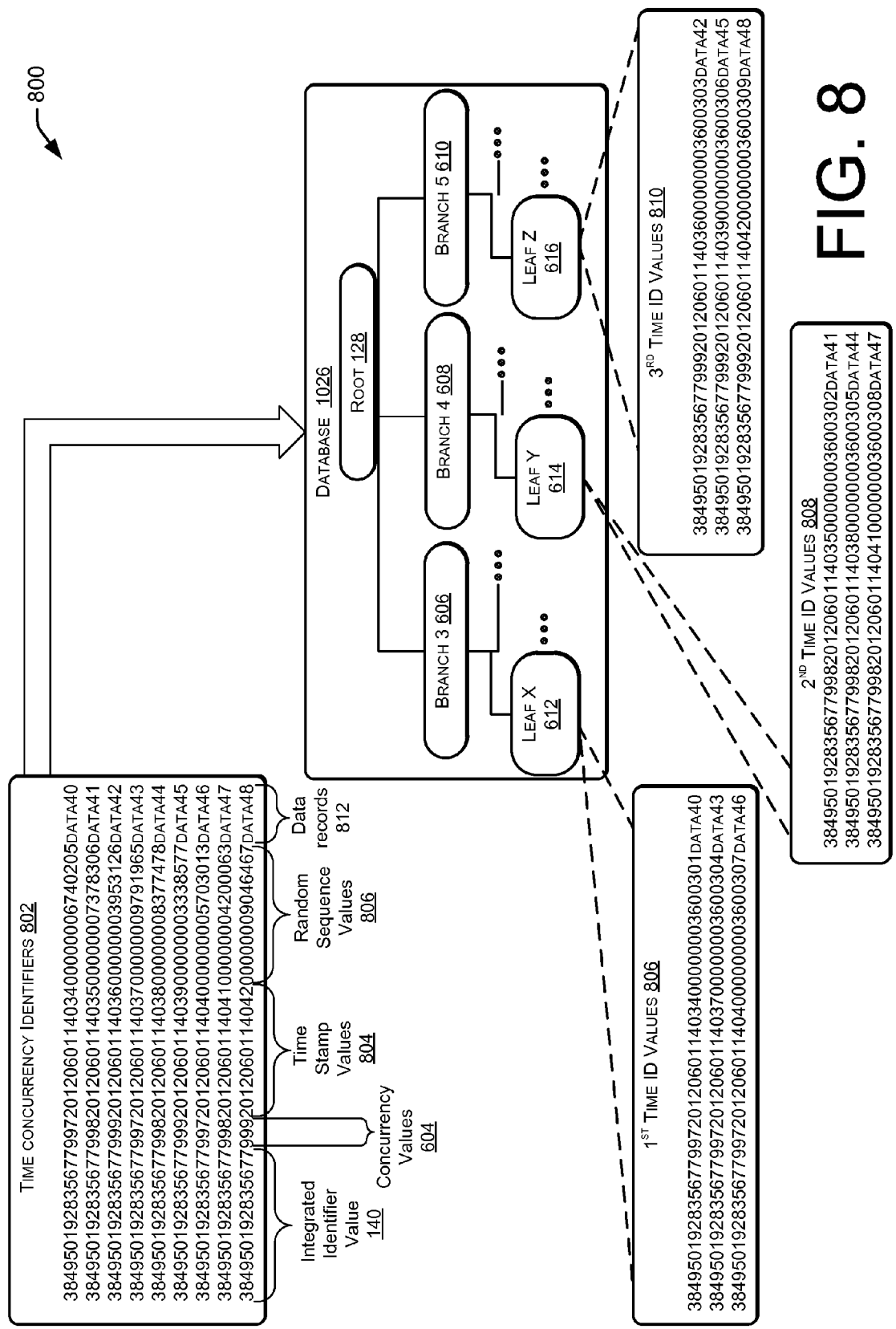
FIG. 8 illustrates an embodiment for managing index contention issues using concurrency values, integrated identifiers, and a time stamp in database row identifiers in accordance with one or more embodiments of the disclosure.

FIG. 8 illustrates one embodiment 800 for using concurrency identifiers 602, integrated identifiers 140, time stamp values 804, random sequence values 806, and data records 812 to generate a time concurrency identifier 802 to mitigate index contention issues in the database 126. In this embodiment 800, the time concurrency identifiers 802 may be arranged by prepending a time stamp value 804 to a random sequence value 806, then prepending a concurrency value 604 to the time stamp value 804, and then prepending an integrated identifier 140 to the concurrency value 604. In other embodiments, the four elements of the time concurrency identifier 802 may be prepended or arranged in any order.

The time stamp values 804 may reflect a time associated with one of the time concurrency identifiers 802. This may include, but is not limited to, the time and/or date the time concurrency identifier 802 was created. In one embodiment, the time concurrency identifier 802 may be created on Jun. 1, 2012 at 11:40:34 am and the corresponding time stamp value 804 may be represented as 2012060114034. In other embodiments, the time stamp's probability of uniqueness may be increased by incorporating a reference to the day (e.g., Monday, Tuesday, . . . ) or tracking the time to a tenth or hundredth of a second (e.g., 11:40:34:23). In another embodiment, the time stamp value may be any other type of value that is incremented in some fashion for each database record.

In this embodiment 800, the concurrency module 124 may store the time concurrency identifiers 802 to one or more hot spots based on the corresponding concurrency value 604. For example, the time concurrency identifiers 802 that include the 997 concurrency value 624 (e.g., $1^{st}$ time ID values 806) may be stored in the first hot spot (e.g., leaf X 612), the time concurrency identifiers 802 that include the 998 concurrency value 626 (e.g., $2^{nd}$ time ID values 808) may be stored in second hot spot (e.g., leaf Y 614), and the time concurrency identifiers 802 that include the 999 concurrency value 628 (e.g., $3^{rd}$ time ID values 708) may be stored in third hot spot (e.g., leaf Z 616).

In another embodiment, the random sequence values 806 of the time concurrency identifiers 802 may be replaced by a unique value that may include, but is not limited to, a universally unique identifier (UUID) or a globally unique identifier (GUID). The UUID may be generated based on the Internet Engineering Task Force standard RFC 4122 (July 2005). The GUID may be generated based on one or more implementations of the UUID standard that includes 128-bit values.

Figure 9:
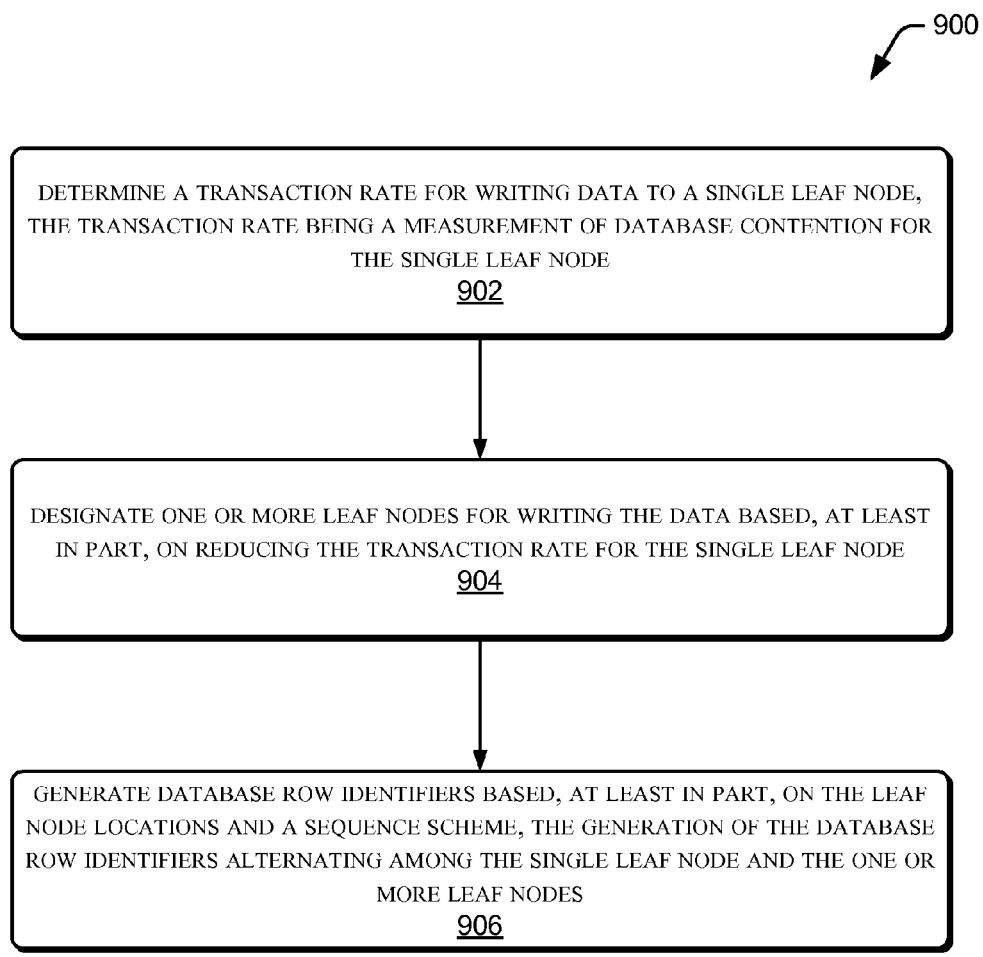
FIG. 9 illustrates a flow diagram for a method for managing index contention issues in accordance with one or more embodiments of the disclosure.

FIG. 9 illustrates a flow diagram for a method 900 for managing index contention issues by storing data in more than one location within a database 126. The concurrency module 124 may monitor the databases of the database server 102 for index contention issues. As noted above, the index contention issues may be the result of the database server 102 attempting to write a relatively large amount of data to a single data block. The contention may slow the transaction rates for the database 126 and may cause latency issues for other systems that may need to use the database 126. Accordingly, the method 900 may implement operations that may mitigate those latency issues. The method 900 illustrates one embodiment of how to mitigate the latency issues. It should be noted that in other embodiments the sequencing of the method 900 may be altered, and some steps may be omitted.

At block 902, the concurrency module 124 may determine a transaction rate for writing data to a single leaf node (e.g., leaf X 612) in a database 126, where the transaction rate is a measurement of database contention for the single leaf node. In one embodiment, the transaction rate may be based, at least in part, on how long a data record takes to be written to the single leaf node. For example, the concurrency module 124 may monitor the amount of time a data record is held in a buffer waiting to be written to the single leaf node. The time for each data record in the buffer may be averaged together and compared against a threshold value that indicates an index contention issue has reached a certain level. As a result, the concurrency module 124 may need to start storing data at a second leaf node (e.g., leaf Y 614) to mitigate any contention issues.

In another embodiment, the transaction rate may be based, at least in part, on how many data records are designated to be written to the single leaf node. The number of data records may be compared against a known or predicted insertion rate to determine if the database 126 may be able to store the data records in a timely manner. For example, if one thousand data records are waiting to be written and the insertion rate is five records per second, the concurrency module 124 may determine that the buffer queue may not be able to work down the queue within a reasonable amount of time based on a known or predicted insertion rate for the single leaf node. In this instance, the threshold may be based, at least in part, on the amount of time needed to work down the queue to a certain level or the ability of the queue to remain at a relatively steady state or steady size, or the impact of the queue has on other transactions or the database as a whole.

In yet another embodiment, the transaction rate may be based, at least in part, on an amount of inserts per second into the single leaf node. The concurrency module 124 may monitor how many data records are being inserted into one or more leaf nodes. When the inserts per second exceed a threshold value, the concurrency module 124 may add at least one additional leaf node to store the data that is waiting to be written. In one embodiment, the database administrator may direct the concurrency module 124 to add the additional leaf node.

At block 904, the concurrency module 124 may designate one or more leaf nodes for writing the data based, at least in part, on reducing the transaction rate for the single leaf node. In one embodiment, the concurrency module 124 may determine that the transaction rate exceeds, or is equal to, a threshold. The threshold may indicate that the index contention for the single leaf node has increased or that the likelihood of the index of contention causing latency issues has increased. The concurrency module 124 may begin writing data to a second leaf node (e.g., leaf Y 614) to mitigate the index contention issue.

In another embodiment, the concurrency module 124 may determine that it needs to write data to two or more leaf nodes based, at least in part, on exceeding a second threshold that is different from the first threshold that enabled adding one additional leaf node. The second threshold may be set to indicate a significant increase in the amount of data that is waiting to be written to the leaf node. Alternatively, the second threshold may also indicate that the transaction rate (e.g., inserts per second) has decreased substantially and may be accommodated by adding two more single leaf nodes (e.g., hot spots) instead of just one single leaf node.

At block 906, the concurrency module 124 may generate record identifiers (e.g., concurrency identifiers 602) based, at least in part, on the leaf node locations (e.g., concurrency values 604) and a sequence scheme (e.g., sequence values 142). In one embodiment the record identifiers (e.g., concurrency identifiers 602) may alternate between the leaf node locations. The record identifiers may be assigned a concurrency value 604 that indicates in which leaf node the database row identifier will be stored. For example, each leaf node may be assigned a concurrency number 624 and any database row identifier that uses that concurrency number 624 may be stored in the respective leaf node (e.g., leaf X 612). In one embodiment, the database server 102 may use three hot spots (e.g., leaf X 612, leaf Y 614, and leaf Z 616) to store data records. The concurrency module 124 may prepend a concurrency number to the record identifiers. In one embodiment, the concurrency value 604 may alternate between each of the concurrency numbers 624, 626, 628 in a systematic manner. This may include alternating the assignment of concurrency values as shown in the concurrency identifiers 602 in FIG. 6. In another embodiment, the prepending of concurrency values 604 may be done in a random manner.

Once the record identifiers are generated, the database module 114 may assign a data record to each of the record identifiers and store the data record in a leaf node location that is referenced within the database row identifier.

Figure 10:
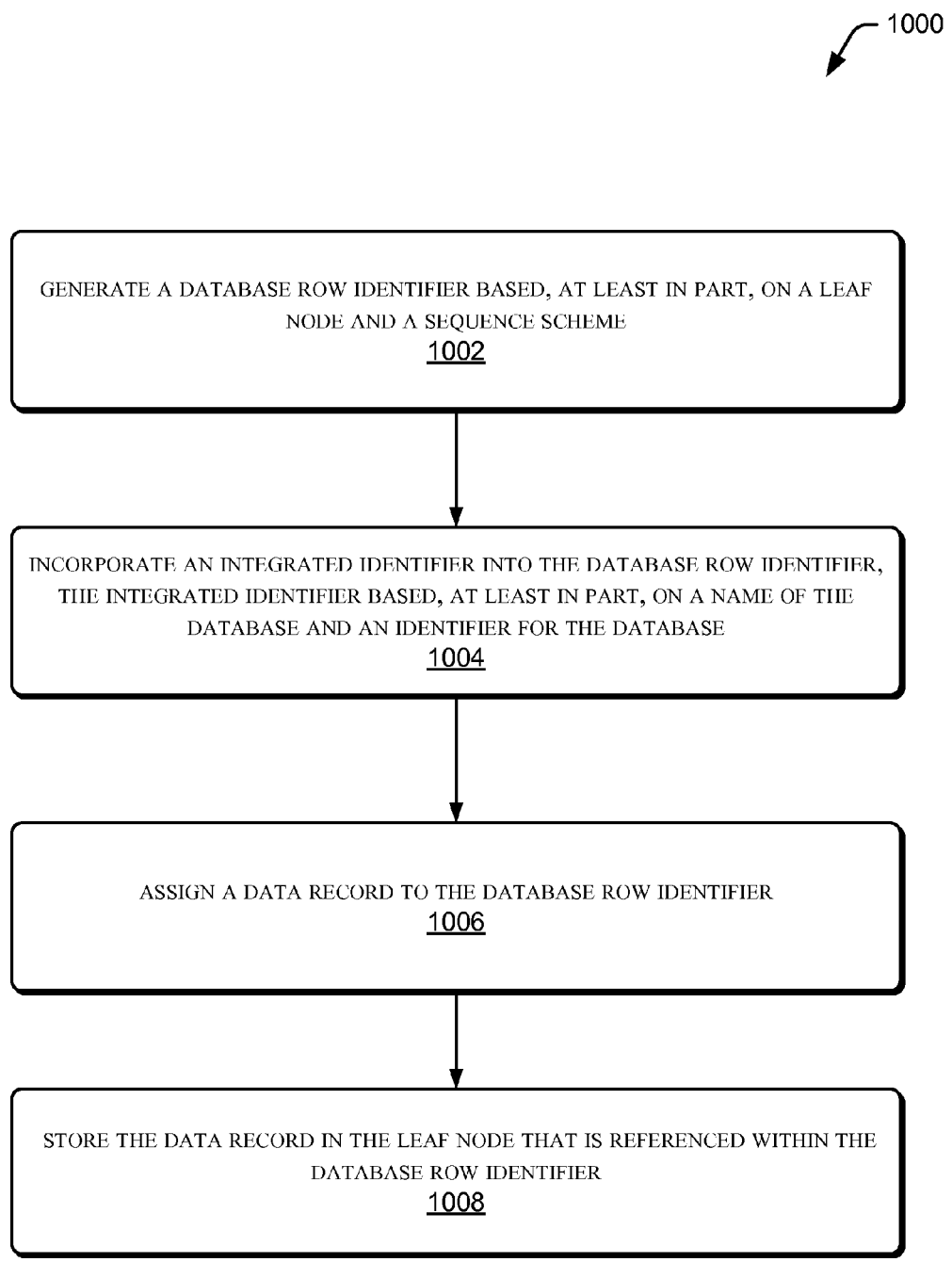
FIG. 10 illustrates another flow diagram for a method for managing index contention issues in accordance with one or more embodiments of the disclosure.

FIG. 10 illustrates another flow diagram for a method 1000 for managing index contention issues and addressing database row identifier uniqueness. The concurrency module 124 may monitor the databases of the database server 102 for index contention issues. Database row identifier uniqueness may be important in maintaining data integrity when storing data into multiple locations. Data may be lost or corrupted when more than one data record is using the same database row identifier. Accordingly, the method 1000 illustrates one embodiment of how to mitigate index contention and uniqueness issues. It should be noted that in other embodiments, the sequencing of the method 1000 may be altered, and some steps may be omitted.

At block 1002, the concurrency module 124 may generate a record identifier (e.g., concurrency identifier 602) based, at least in part, on a leaf node (e.g., leaf X 612) and a sequence scheme (e.g., sequence values 142). The concurrency identifier 602 may be similar to the concurrency identifiers described above in the description of FIG. 9. However, the concurrency identifier 602 may be modified to increase the probability of uniqueness for the record identifiers. As shown in FIG. 7, the concurrency values 604 may be assigned to their respective hot spots (e.g., leaf X 612, leaf Y 614, and leaf Z 616). Accordingly, the record identifiers may be stored in their respective hot spots based, at least in part, on the concurrency value 604 in the integrated concurrency identifier 702.

At block 1004, the concurrency module 124 may also incorporate an integrated identifier 140 into the record identifier (e.g., integrated concurrency identifier 702). In one embodiment, the integrated identifier 140 may be based, at least in part, on a name 216 of the database 126 and an identifier 218 for the database 126. The integrated identifier 140 increases the probability of uniqueness of the integrated concurrency identifier 702.

In another embodiment, the identifier module 120 may hash the identifier 218 and the name 216 to generate the integrated identifier 140. The hashing process may include any hashing technique preferred by the service owner. The hashing techniques may include, but are not limited to, string hashing or geometric hashing. In one embodiment, the integrated identifier 140 should be a string or value with at least 15 digits.

At block 1006, the database module 114 may assign a data record to the integrated concurrency identifier 702. The data record may include any type of data that may be stored in a database.

At block 1008, the database server 102 may store the data record in the leaf node that is referenced by the concurrency value 604 within the integrated concurrency identifier 702. In one embodiment, the integrated concurrency identifier 702 may include 997 as the concurrency number 624, which indicates that the integrated concurrency identifier 702 may be stored in a designated hot spot (e.g., leaf X 612). Likewise, when the integrated concurrency identifier 702 includes 998 as the concurrency number 626, this indicates that the integrated concurrency identifier 702 may be stored in a designated hot spot (e.g., leaf Y 614). Although the concurrency numbers 624, 626 are shown as three digit numbers, in other embodiments, the concurrency values 604 may be of any length and may include numbers, letters, or a combination thereof.

Figure 11:
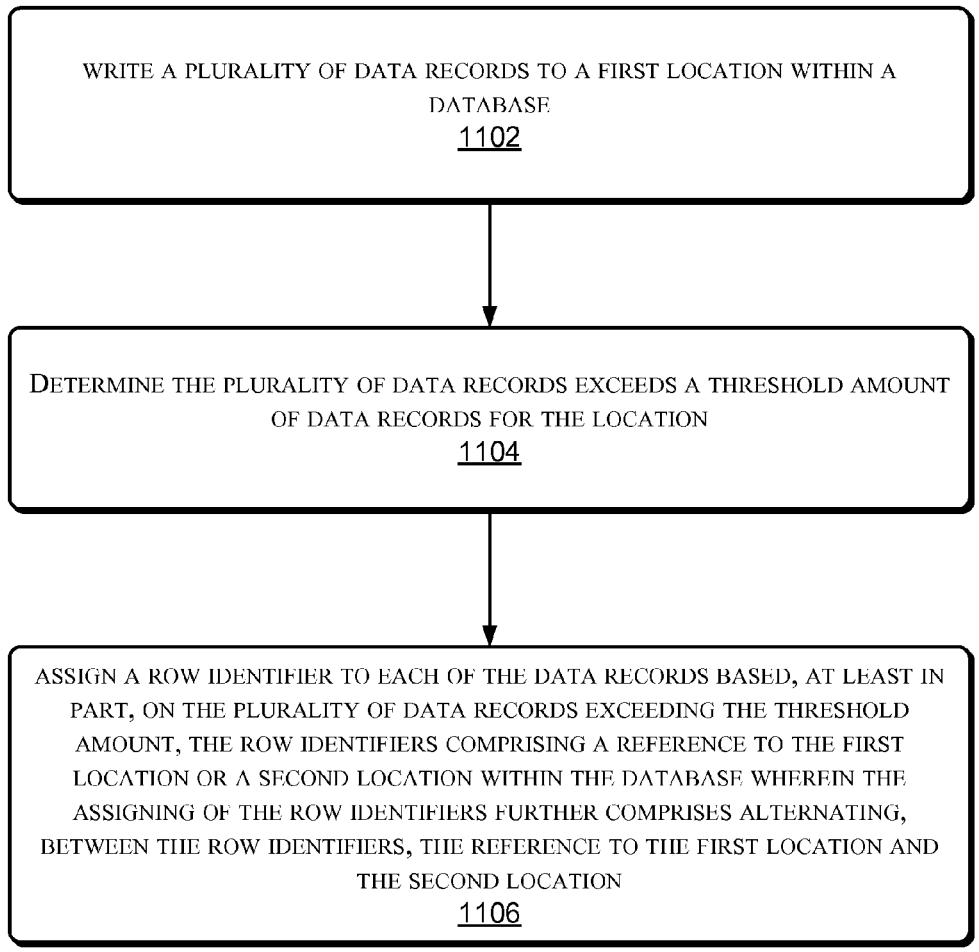
FIG. 11 illustrates another flow diagram for a method for managing index contention issues in accordance with one or more embodiments of the disclosure.

FIG. 11 illustrates a flow diagram for a method 1100 for managing index contention issues by increasing the number of hot spots within a database 126. The concurrency module 124 may monitor the database 126 for index contention issues. As noted above, the index contention issues may be the result of the database server 102 attempting to write a relatively large amount of data to a single data block. Accordingly, the method 1100 may implement operations that may mitigate the contention issues. It should be noted that in other embodiments the sequencing of the method 1100 may be altered, and some steps may be omitted.

At block 1102, the database module 114 may write a plurality of data records to a first location (e.g., leaf X 612) within the database 126. In one embodiment, the first location may be the sole hot spot for the database 126. The record identifiers used at the first location may not include concurrency values since there is only one hot spot. The database module 114 may continue to use the first location to store data until index contention issues are detected.

At block 1104, the concurrency module 124 may determine that the plurality of data records exceeds a threshold amount of data records for the first location. The amount of records waiting to be written at the first location is one of many threshold conditions that may be used. In this instance, the number of records has exceeded a threshold amount that may be set by the database administrator or may be based on latency performance between the database 126 and other devices that use the database information to perform tasks. Exceeding or equaling the threshold amount directs the concurrency module 124 to initiate a second location (e.g., second hot spot) to store the plurality of data. However, the record identifiers may not include a reference to a hot spot location (e.g., the first location) since there was only one location being written to by the database module 114.

At block 1106, the concurrency module 124 may assign a new row identifier to each of the data records based, at least in part, on the plurality of data records exceeding the threshold amount. The row identifiers may comprise a reference (e.g., concurrency number 624) to the first location (e.g., leaf X 612) or the second location (e.g., leaf Y 614) within the database 126. The concurrency module 125 may assign the concurrency values 624 to the row identifiers in a systematic or random manner. The concurrency module 125 may systematically assign the concurrency values 604 in a sequential order. In the instance of a three hot spot embodiment, the concurrency module 124 may assign a first concurrency number 624 to a first row identifier that is designated for the first hot spot (e.g., leaf X 612), a second concurrency number 626 to a second row identifier that is designated for the second hot spot (e.g., leaf Y 614), and a third concurrency number 628 to a third row identifier that is designated for the third hot spot (e.g., leaf Z 616). The concurrency module 124 may iterate the concurrency value 624, 626, 628 assignment process for the next three row identifiers, as shown in the concurrency identifiers 602 in FIG. 6.

As noted above, the assignment process may also be expanded from a two hot spot embodiment to a three hot spot embodiment. In this case, the concurrency module 124 may determine the plurality of data records exceeds a threshold amount of data records for the first location (e.g., leaf X 612) or the second location (e.g., leaf Y 614). The concurrency module 124 may initiate a third location (e.g., leaf Z 616) to store the plurality of data records. In this case, a third concurrency number 628 may be included in the row identifiers. This may be done by assigning a row identifier to each of the data records that includes a reference (e.g., concurrency numbers 624, 626, 628) to the first location (e.g., leaf X 612), the second location (e.g., leaf Y 614), or a third location (e.g., leaf Z 616) within the database 126.

Figure 12:
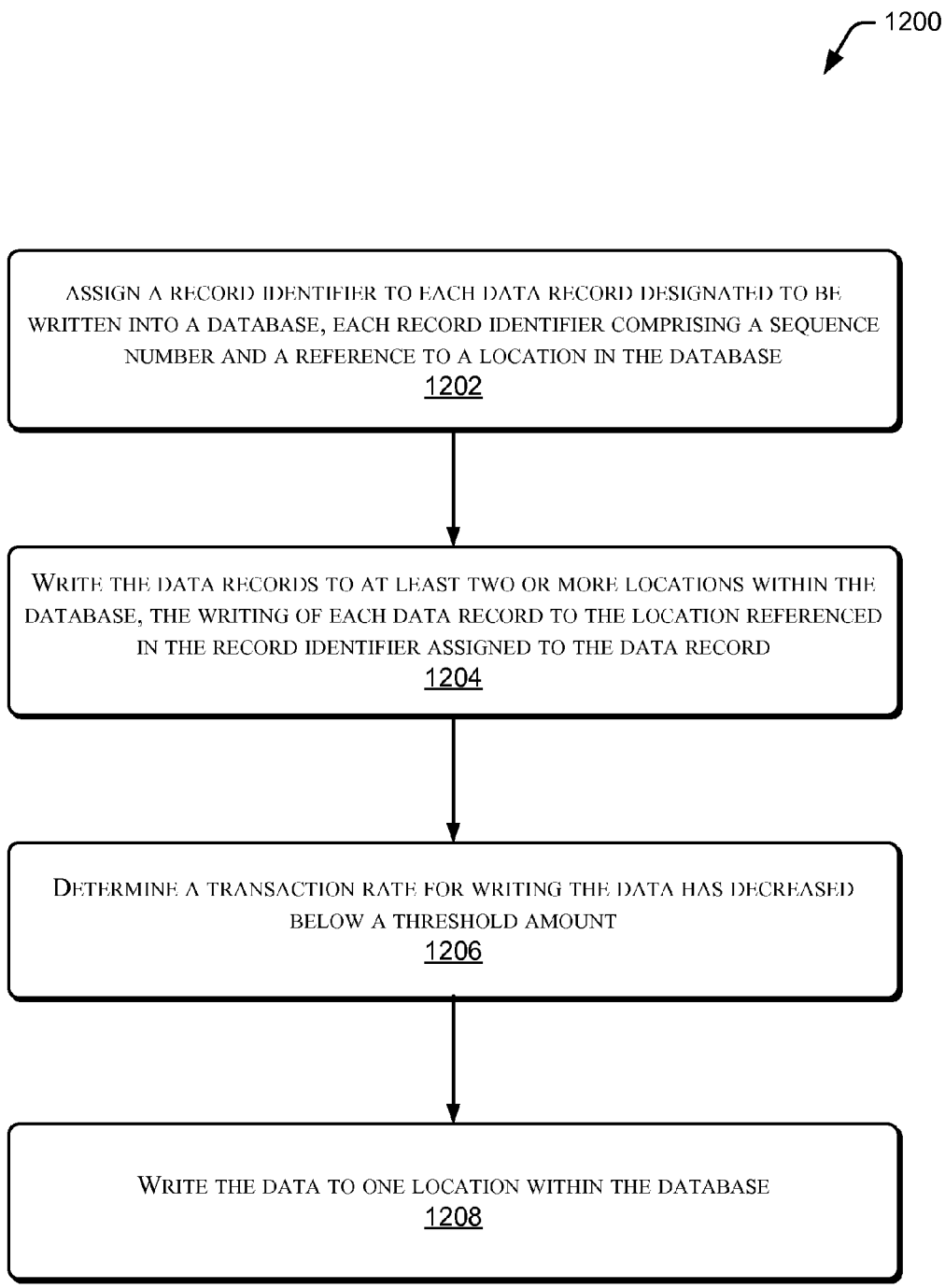
FIG. 12 illustrates a flow diagram for a method for decreasing the amount of database locations being written to in accordance with one or more embodiments of the disclosure.

FIG. 12 illustrates a flow diagram for a method for decreasing the amount of database locations being written to when the amount of data records waiting to be stored in a database decreases below a threshold value. As noted above, the index contention issues may be the result of the database server 102 attempting to write a relatively large number of data records to the same data block at a high frequency or throughput. However, when the number of data records decreases, the database administrator may be able to maintain operational efficiency with a lower amount of hot spots. Accordingly, the method 1200 may implement operations that may reduce the number of hot spots. It should be noted that in other embodiments the sequencing of the method 1200 may be altered, and some steps may be omitted.

At block 1202, the concurrency module 124 may assign a record identifier to each data record designated to be written into a database 126. Each of the record identifiers may include, but are not limited to, a sequence value 142 and a location reference number or concurrency value 604. The location reference number may be an indication of where the data record may be stored. For example, the location reference number may be associated with a leaf node 612 in a database 126.

At block 1204, the data records may be written into the database at two or more locations. The concurrency module 124 may be writing data to two or more locations to relieve an index contention issue based on the amount of data waiting to be inserted into the database 126. The use of the two or more locations may be increased or decreased based on the amount of data waiting to be inserted into the database 126.

At block 1206, the concurrency module 124 may determine a transaction rate for writing the data has decreased below a threshold amount. In one embodiment, the transaction rate may be based, at least in part, on how long at least one of the data records waits to be written to the database. In another embodiment, the transaction rate may be based, at least in part, on how many data records are designated to be written to the database 126. In yet another embodiment, the transaction rate is based, at least in part, on an amount of inserts per second into the database.

At block 1208, the database 126 may begin writing the data records to one location within the database, based, at least in part, on when the amount of data waiting or designated to be inserted into the database is below the threshold limit. However, when the amount of data increases back over the threshold limit, the concurrency module 124 may add additional locations to mitigate index contention issues.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one network communication device configured to communicate with one or more computing devices;
    at least one memory that stores computer-executable instructions and a database arranged in a horizontally partitioned manner, the database comprising one or more leaf nodes; and
    at least one processor configured to access the at least one network communication device and the at least one memory, and execute the computer-executable instructions to:

determine a transaction rate for writing data to a single leaf node of the one or more leaf nodes, the transaction rate being a measurement of database contention for the single leaf node;

designate at least one leaf node of the one or more leaf nodes to write the data to based, at least in part, on reducing the transaction rate for the single leaf node;

generate record identifiers based, at least in part, on one or more locations of the at least one leaf node within the database and a sequence scheme;

prepend a respective integrated identifier to a particular record identifier, wherein the respective integrated identifier is based, at least in part, on a name of the database and an identifier for the database;

assign a data record to the particular record identifier; and store the data record in a leaf node location that is referenced within the particular record identifier.

2. A system, comprising:

at least one network communication device configured to communicate with one or more computing devices;

at least one memory that stores computer-executable instructions and a database arranged in a horizontally partitioned manner; and at least one processor configured to access the at least one network communication device and the at least one memory, and execute the computer-executable instructions to:

generate a first record identifier comprising a sequence number and a first concurrency value, wherein the first concurrency value uniquely references a first database location within the database;

assign a first data record to the first record identifier; and store the first data record in the first database location that is referenced by the first concurrency value determine that an amount of data to be written to the first database location exceeds a threshold;

in response to determining that the amount of data to be written to the first database location exceeds the threshold, generate a second record identifier comprising a second concurrency value that uniquely references a second database location within the database;

assign a second data record to the second record identifier; and store the second data record in the second database location that is referenced by the second concurrency value within the second record identifier.

3. A method, comprising:

generating a first record identifier comprising a sequence number and a first concurrency value, wherein the first concurrency value uniquely references a first database location within a database that is arranged in a horizontally partitioned manner;

assigning a first data record to the first record identifier; and storing the first data record in the first database location that is referenced by the first concurrency value determining that an amount of data to be written to the first database location exceeds a threshold;

in response to determining that the amount of data to be written to the first database location exceeds the threshold, generating a second record identifier comprising a second concurrency value that uniquely references a second database location within the database;

assigning a second data record to the second record identifier; and storing the second data record in the second database location that is referenced by the second concurrency value within the second record identifier.

4. One or more non-transitory computer-readable media storing computer-executable instructions that responsive to execution by at least one processor configure the at least one processor to perform operations comprising:

generating a first record identifier comprising a sequence number and a first concurrency value, wherein the first concurrency value uniquely references a first database location within a database that is arranged in a horizontally partitioned manner;

assigning a first data record to the first record identifier; and storing the first data record in the first database location that is referenced by the first concurrency value determining that an amount of data to be written to the first database location exceeds a threshold;

in response to determining that the amount of data to be written to the first database location exceeds the threshold, generating a second record identifier comprising a second concurrency value that uniquely references a second database location within the database;

assigning a second data record to the second record identifier; and storing the second data record in the second database location that is referenced by the second concurrency value within the second record identifier.

5. The system of claim 1, wherein the sequence scheme comprises a random or non-sequential numbering scheme, and wherein the at least one processor is further configured to execute the computer-executable instructions to assign a respective time stamp to the particular record identifier, the respective time stamp comprising a respective reference to one or more of the following: a time of day of when the particular record identifier was generated or a date of when the particular record identifier was generated.

6. The system of claim 1, wherein the transaction rate is based, at least in part, on an amount of time associated with writing the data to the database.

7. The system of claim 1, wherein the transaction rate is based, at least in part, on a number of records designated to be written to the single leaf node.

8. The system of claim 1, wherein the transaction rate is based, at least in part, on an amount of inserts per second into the database at the single leaf node.

9. The system of claim 2, wherein the threshold is a first threshold, and wherein the at least one processor is further configured to execute the computer-executable instructions to:

determine that a combined amount of data to be written to the first database location and the second database location exceeds a second threshold;

in response to determining that the combined amount of data to be written to the first database location and the second database location exceeds the second threshold, generate a third record identifier comprising a third concurrency value that uniquely references a third database location within the database;

assign a third data record to the third record identifier; and store the third data record in the third database location that is referenced by the third concurrency value within the third record identifier.

10. The system of claim 2, wherein:

the first database location forms at least part of a first leaf node of the database, the second database location forms at least part of a second leaf node of the database, and the sequence number comprises a unique value for the first database location.

11. The system of claim 2, wherein the sequence number is a first sequence number, and wherein the at least one processor is further configured to execute the computer-executable instructions to:

in response to determining that the amount of data to be written to the first database location has decreased below the threshold, generate a third record identifier comprising the first concurrency value and a second sequence number;

assign a third data record to the third record identifier; and store the third data record in the first database location that is referenced by the first concurrency value within the third record identifier.

12. The system of claim 2, wherein the sequence number comprises a time stamp value comprising a first portion indicating a date that the record identifier was generated and a second portion indicating a time of day that the record identifier was generated.

13. The method of claim 2, wherein the threshold is a first threshold, the method further comprising:

determining that a combined amount of data to be written to the first database location and the second database location exceeds a second threshold;

in response to determining that the combined amount of data to be written to the first database location and the second database location exceeds the second threshold, generating a third record identifier comprising a third concurrency value that uniquely references a third database location within the database;

assigning a third data record to the third record identifier; and storing the third data record in the third database location that is referenced by the third concurrency value within the third record identifier.

14. The method of claim 3, wherein:

the first database location forms at least part of a first leaf node of the database, the second database location forms at least part of a second leaf node of the database, and the sequence number comprises a unique value for the first database location.

15. The method of claim 3, wherein the sequence number is a first sequence number, the method further comprising:

in response to determining that the amount of data to be written to the first database location has decreased below the threshold, generate a third record identifier comprising the first concurrency value and a second sequence number;

assign a third data record to the third record identifier; and store the third data record in the first database location that is referenced by the first concurrency value within the third record identifier.

16. The method of claim 3, wherein the sequence number comprises a time stamp value comprising a first portion indicating a date that the record identifier was generated and a second portion indicating a time of day that the record identifier was generated.

17. The one or more non-transitory computer-readable media of claim 4, the operations further comprising:

determining that a combined amount of data to be written to the first database location and the second database location exceeds a second threshold;

in response to determining that the combined amount of data to be written to the first database location and the second database location exceeds the second threshold, generating a third record identifier comprising a third concurrency value that uniquely references a third database location within the database;

assigning a third data record to the third record identifier; and storing the third data record in the third database location that is referenced by the third concurrency value within the third record identifier.

18. The one or more non-transitory computer-readable media of claim 4, wherein the sequence number is a first sequence number, the operations further comprising:

in response to determining that the amount of data to be written to the first database location has decreased below the threshold, generate a third record identifier comprising the first concurrency value and a second sequence number;

assign a third data record to the third record identifier; and store the third data record in the first database location that is referenced by the first concurrency value within the third record identifier.

19. The system of claim 9, wherein at least one of the first record identifier, the second record identifier, or the third record identifier comprises an integrated identifier generated based, at least in part, on a numerical representation of a name of the database and an identifier for the database.

20. The method of claim 13, wherein at least one of the first record identifier, the second record identifier, or the third record identifier comprises an integrated identifier generated based, at least in part, on a numerical representation of a name of the database and an identifier for the database.

* * * * *